US012639191B2

(12) United States Patent
Wilson et al.

(10) Patent No.: US 12,639,191 B2
(45) Date of Patent: May 26, 2026

(54) MANAGING HARDWARE BUNDLE PERFORMANCE IN PRODUCTION ENVIRONMENTS

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 183 days.

(21) Appl. No.: 18/455,829

(22) Filed: Aug. 25, 2023

(65) Prior Publication Data

US 2025/0068541 A1    Feb. 27, 2025

(51) Int. Cl.
*G06F 11/34* (2006.01)
*G06F 9/50* (2006.01)

(52) U.S. Cl.
CPC .......... *G06F 11/3495* (2013.01); *G06F 9/505* (2013.01)

(58) Field of Classification Search
None
See application file for complete search history.

(56) References Cited

U.S. PATENT DOCUMENTS

| 8,606,667 | B2 | 12/2013 | Ferris |
| 10,817,398 | B2 | 10/2020 | Cencini et al. |
| 10,931,550 | B2 | 2/2021 | Kumar et al. |
| 11,249,790 | B1 | 2/2022 | Gupta |
| 11,272,267 | B2 | 3/2022 | Herdrich et al. |
| 11,429,669 | B2 | 8/2022 | Renjith |
| 11,558,381 | B2 | 1/2023 | Avetisov et al. |
| 12,265,858 | B1 | 4/2025 | Bhattacharyya |
| 2003/0065958 | A1 | 4/2003 | Hansen |
| 2007/0118771 | A1 | 5/2007 | Bolan |

(Continued)

FOREIGN PATENT DOCUMENTS

| WO | 2018102456 A1 | 6/2018 |
| WO | 2020000175 A1 | 1/2020 |

OTHER PUBLICATIONS

"Monitoring for DPU capacity planning," Amazon Web Services, Web Page <https://docs.aws.amazon.com/glue/latest/dg/monitor-debug-capacity.html> accessed on Sep. 6, 2022 (7 Pages).

*Primary Examiner* — Fahmida Rahman
(74) *Attorney, Agent, or Firm* — WOMBLE BOND DICKINSON (US) LLP

(57)    ABSTRACT

Methods, systems, and devices for providing computer implemented services using managed systems are disclosed. To provide the computer implemented services, hardware components may be bundled into hardware bundles. The hardware bundles may be used to satisfy subscriptions for the services, and limit use of the hardware bundles when subscription limits are reached. The hardware bundles may include direct management hardware components and indirect management hardware components. The performance of the hardware bundles may be characterized to facilitate future selection for use of the hardware bundles in various processes. Overtime, the performance of the hardware bundles may be checked.

20 Claims, 19 Drawing Sheets

(56)  References Cited

U.S. PATENT DOCUMENTS

| | | | |
|---|---|---|---|
| 2010/0058347 A1* | 3/2010 | Smith | G06F 9/50 |
| | | | 718/104 |
| 2011/0022812 A1 | 1/2011 | van der Linden | |
| 2012/0304191 A1 | 11/2012 | Morgan | |
| 2013/0073403 A1 | 3/2013 | Tuchman | |
| 2015/0317189 A1 | 11/2015 | Georgescu | |
| 2016/0150400 A1 | 5/2016 | Cha | |
| 2018/0285009 A1 | 10/2018 | Guim Bernat | |
| 2019/0354411 A1 | 11/2019 | Raikov | |
| 2020/0004601 A1 | 1/2020 | Ahmad | |
| 2022/0075657 A1* | 3/2022 | Shimada | G06F 11/3409 |
| 2022/0121267 A1 | 4/2022 | Woolcock | |
| 2022/0179695 A1 | 6/2022 | Dawkins | |
| 2022/0179707 A1 | 6/2022 | Jreij | |
| 2022/0300339 A1 | 9/2022 | Iyer | |
| 2022/0321728 A1 | 10/2022 | Minamiyama | |
| 2023/0229512 A1 | 7/2023 | Sawal | |
| 2024/0004711 A1 | 1/2024 | Young, Jr. | |
| 2024/0273524 A1 | 8/2024 | Fang | |
| 2025/0068436 A1 | 2/2025 | Wilson | |
| 2025/0068470 A1 | 2/2025 | Wilson | |
| 2025/0068476 A1 | 2/2025 | Wilson | |
| 2025/0068477 A1 | 2/2025 | Wilson | |
| 2025/0068478 A1 | 2/2025 | Wilson | |
| 2025/0068479 A1 | 2/2025 | Wilson | |
| 2025/0068480 A1 | 2/2025 | Wilson | |
| 2025/0068541 A1 | 2/2025 | Wilson | |
| 2025/0069171 A1 | 2/2025 | Wilson | |

* cited by examiner

MANAGING HARDWARE BUNDLE PERFORMANCE IN PRODUCTION ENVIRONMENTS

FIELD DISCLOSED HEREIN

Embodiments disclosed herein relate generally to system management. More particularly, embodiments disclosed herein relate to systems and methods to manage use of components of a distributed system.

BACKGROUND

Computing devices may provide various services. For example, computing devices may host applications that store data, process data, and generate data thereby providing services. Depending on the type of processing performed, different hardware and software components available for use in the type of processing may be used to provide the processing.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
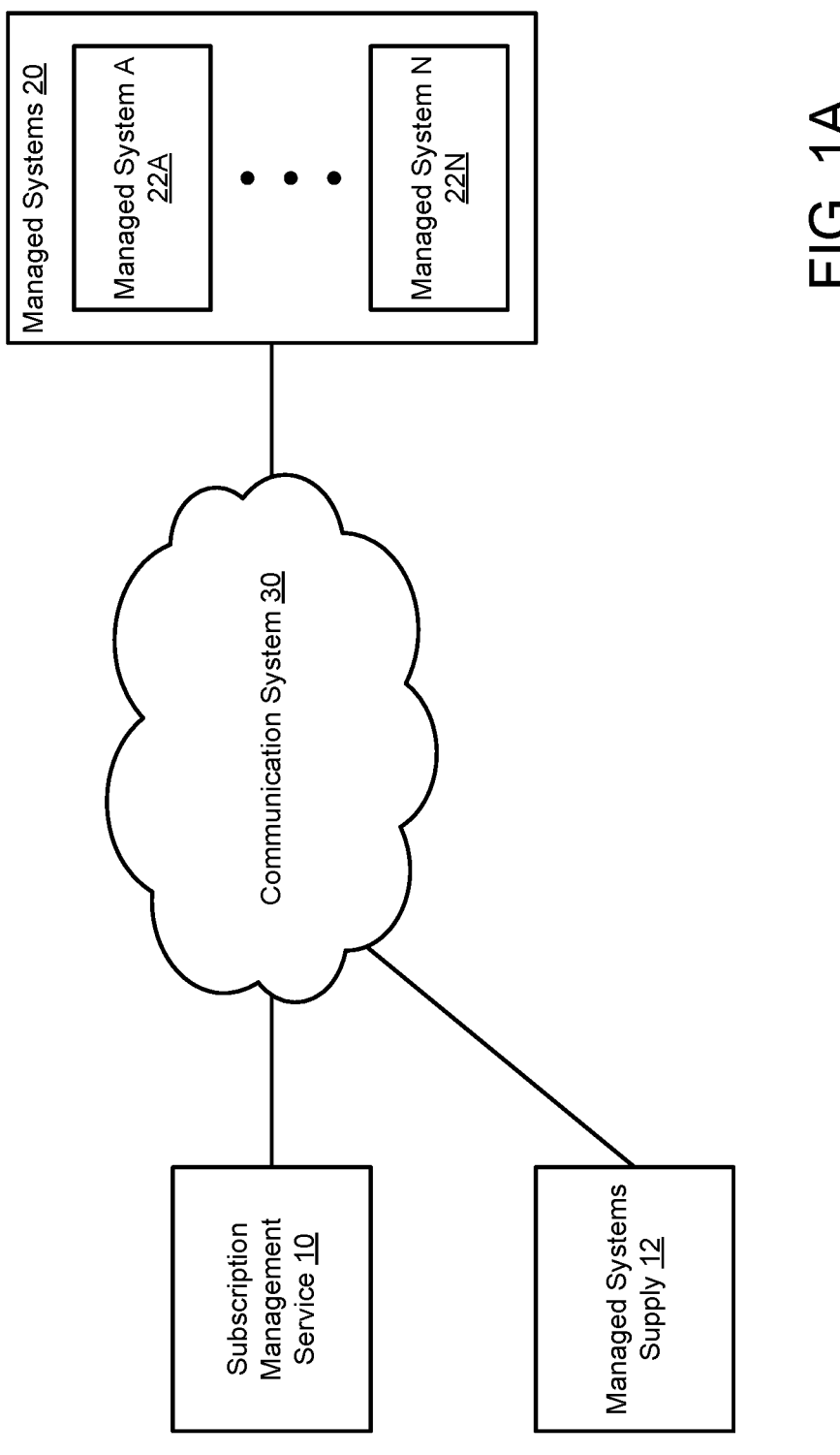
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To improve the likelihood of the computer implemented services being provided, embodiments disclosed here relate to methods and systems for managing managed systems using a subscription based model. The subscription model may utilize a highly accessible service to obtain information regarding capabilities (e.g., hardware resources) of managed systems to present information regarding all potential solutions that the managed systems may provide.

By presenting users with such information, the users may not need to be well versed in the underlying hardware and software components necessary for the solutions to be provided.

Once a user selects which services to be provided, various subscriptions may be established and forwarded to managed systems for implementation. To implement the subscriptions, the managed system may selectively enable various hardware to host software.

To manage the hardware, some hardware may be bundled for manageability. The hardware may be bundled based on the ability for the bundled hardware to be managed at the bundle level, as well as other factors.

As part of bundling, the hardware bundle may be characterized with respect to estimated performance levels for various workloads. Confidence in the estimated performance levels may also be obtained. The estimated performance levels and confidence in the estimates may be used to select which hardware bundles to use in servicing subscriptions.

To select hardware bundles to service subscriptions, the degree to which the hardware bundles may adjust performance may be compared to limitations that may be imposed on the subscriptions. The comparison may indicate whether the hardware bundle is able to enforce subscription limitations that may be enforced over time. Hardware bundles having sufficient adjustability in performance may be selected for use in servicing subscriptions.

When selected for use in supporting a subscription, the operation of directly manageable hardware components of the hardware bundle may be updated to modify the overall operation of the hardware bundle. The updated operation may facilitate selective use of the functionality of the hardware bundle to enable the subscribed to services to be provided to the users of the managed system.

When so provided, the operation of the hardware bundle may be at least partially limited (e.g., down from a maximum level attainable) to enforce subscription limitations on the services provided using the hardware bundle. The performance of the hardware bundle may be monitored over time to identify whether the subscribed to services meet expectations established as part of the subscriptions.

By doing so, managed systems may be deployed with additional resources from those necessary to provide desired services at a time of deployment. Overtime, various resources may be selectively enabled for use, in accordance with various subscriptions that may be entered into by users of the managed system.

In an embodiment, a method for managing computer implemented services provided by a managed system is disclosed. The method may include establishing, by a local subscription manager, a monitoring procedure for a hardware bundle that contributes to performance of the computer implemented services, and the hardware bundle comprising at least one directly manageable hardware component and at least one indirectly manageable hardware component; obtaining, by the local subscription manager and based on the monitoring procedure, metrics during performance of a workload by the hardware bundle; making, by the local subscription manager, a determination regarding whether the metrics met performance metrics for the hardware bundle; and in a first instance of the determination where the metrics did not meet the performance metrics: updating operation of the hardware bundle to improve a likelihood of future metrics based on future performance of a future workload by the hardware bundle meeting the performance metrics.

The monitoring procedure may indicate performance of monitoring actions by the at least one directly manageable hardware component.

Obtaining the metrics may include performing, by the at least one directly manageable hardware component. The monitoring actions may be performed to obtain a first portion of the metrics that indicate a first performance level of the at least one directly manageable hardware component and a second performance level of the at least one indirectly manageable hardware component.

The performance metrics may include a first sub-metric as a first basis of comparison for the first performance level and a second sub-metric as a second basis of comparison for the second performance level.

Updating the operation of the hardware bundle may include reducing, by the directly manageable hardware component, a level of restriction imposed on the second performance level to obtain an updated level of the restriction.

The level of restriction may be based, at least in part, on a subscription that governs an extent of use of the hardware bundle by a user.

Reducing the level of restriction may include expanding, by the directly manageable hardware component, a range of communications that are passed to indirectly manageable hardware component.

The at least one directly manageable hardware component may be adapted to be managed by the local subscription manager.

The at least one indirectly manageable hardware component may not be manageable by the local subscription manager.

The at least one directly manageable hardware component may be operably connected to the at least one indirectly manageable hardware component in a communication topology that facilitates screening of communications to the at least one indirectly manageable hardware component.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services. Changes in the hardware and/or software components may provide for various types of different computer implemented services to be provided over time.

The computer implemented services may include any number and type of computer implemented services. The computer implemented services may include, for example, database services, data processing services, electronic communication services, and/or any other types of services that may be provided using one or more computing devices. Other types of computer implemented services may be provided by managed systems 20 without departing from embodiments disclosed herein.

Figure 1B:
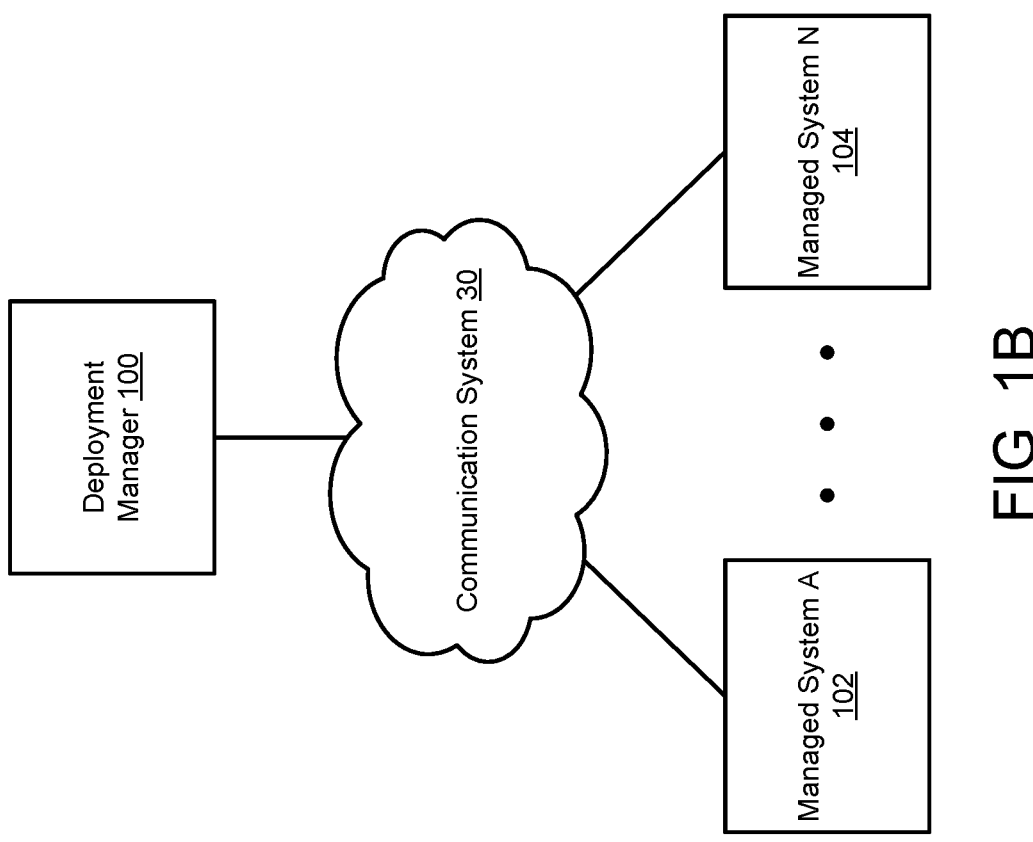
FIG. 1B shows a block diagram illustrating a deployment in accordance with an embodiment.
Figure 1C:
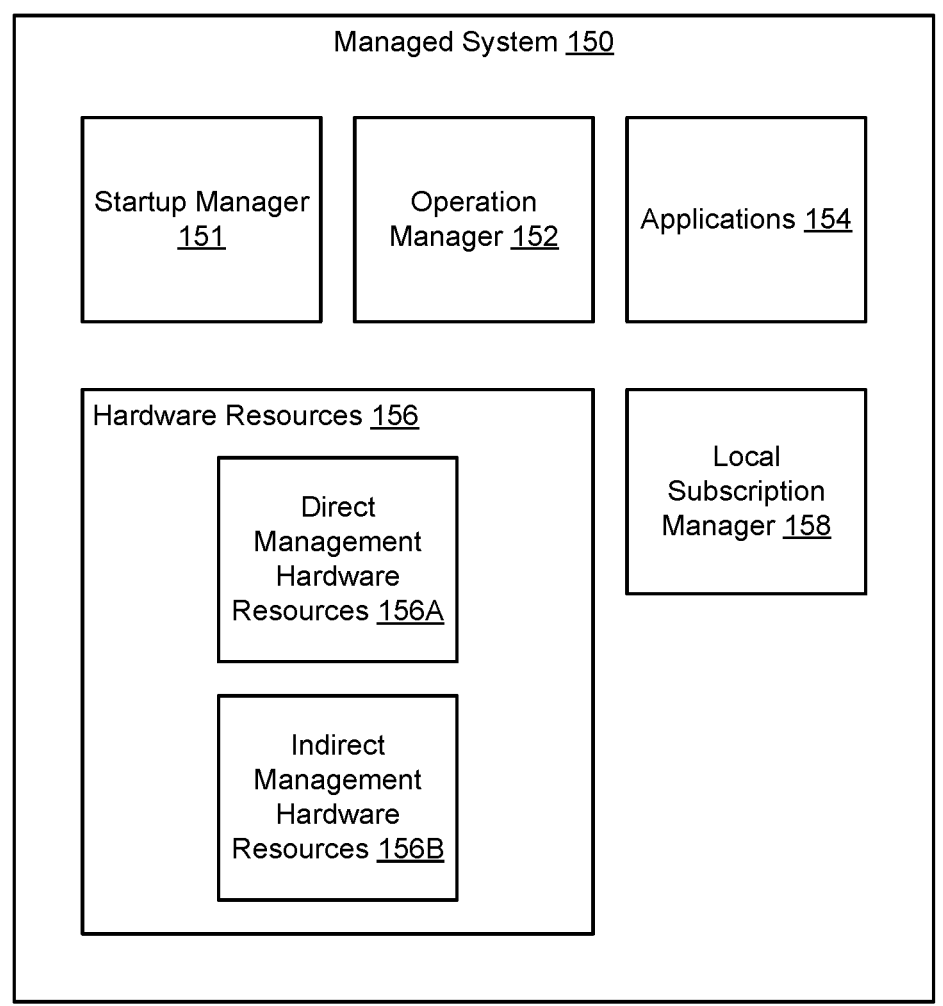
FIG. 1C shows a block diagram illustrating a managed system in accordance with an embodiment.

To provide the aforementioned computer implemented services, any of managed systems 22 (e.g., 22A, 22N) may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently and/or cooperatively with other such managed systems. In such scenarios, the operation of a group of managed system may be managed by a local control plane for those managed systems. Refer to FIG. 1B for additional details regarding groups of managed systems.

However, to provide desired computer implemented services, as noted above, a managed system may need to have certain capabilities. For some capabilities, such as those that are provided by software components, a lack of the capability may be remediated by deploying appropriate software components (which may assume that certain hardware components necessary for operation of the software components are available). However, some capabilities may require certain hardware components to be present in a managed system.

For example, in a data storage scenario, a managed system may need to include a hardware storage controller for certain storage functionalities (e.g., deduplication, redundancy, etc.) to be provided. In another example, a managed system may need to include a graphics processing unit, application specific integrated circuit, or other type of special purpose hardware device to provide other types of functionalities (e.g., at a desired rate, and/or to provide the functionality at all). In a further example, a managed system may need to include minimum quantities and/or types of general computing components such as processors, memory modules, storage devices, etc. for other types of functionalities to be provided at certain rates to meet service level agreement requirements or other types of service requirements.

If a managed system is instructed to perform various functionalities but which is unable to provide the functionalities due to lack of hardware components, then the managed system may not provide the functionalities. Further, if operating in cooperation with other managed systems to provide various functionalities, a failure in the ability of the managed system to provide specified functionalities may impact the ability of all of the managed systems to provide desired functionalities. Thus, if capabilities of managed systems are not carefully considered when making configuration decisions, the resulting configured managed systems may be unable to provide or may only provide impaired (to some extent) desired computer implemented services.

In general, embodiments disclosed herein relate to system, devices and methods for managing one or more managed systems (e.g., 20) in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). The distributed system may automatically perform processes for discovering capabilities of managed systems, and configuring the managed systems to provide desired solutions.

To manage for configuration of the managed systems, users of the managed systems may enter into subscriptions for use of the managed systems. The subscriptions may define how the users are allowed to use the systems. The specific configurations of the managed systems may be set based on the subscriptions.

To provide for system flexibility in implementation of the subscriptions, the system of FIG. 1A may implement a distributed management model where different authority for implementation of subscriptions is granted to different entities. By distributing the authority for decision making, efficiency of resource use may be improved. For example, by placing authority for lower level configuration decisions at local entities that may have access to more information regarding local resources, the local entities may be in a better position to make configuration decisions when compared to high level management entities.

To improve the likelihood of managed systems being able to provide desired services over time, managed systems may be over provisioned with resources when compared to those resources necessary to provide services known to be desired at the time of deployment. Use of the over-provisioned resources (e.g., processors, memory modules, storage devices, communication components, etc.) may be limited until additional subscriptions are agreed to by the users of the managed systems. Once the additional subscriptions are established, use of the over-provisioned resources may be enabled.

To facilitate management of resources in accordance with subscriptions, the managed systems may bundle hardware components with different management capabilities together to established hardware bundles that are manageable in accordance with subscriptions. For example, some hardware components may be directly manageable hardware components that include functionality to selectively enable/disable their functionalities while other hardware components may be indirectly manageable hardware components. In contrast to directly manageable hardware components, indirectly manageable hardware components may lack functionality to selectively enable/disable their functionalities. However, by establishing hardware bundles, the overall functionality of directly and indirectly manageable hardware components may be made directly manageable at a bundle level. Consequently, the bundle level management functionalities of the hardware bundles may be used to conform the operation of the managed systems to those functionalities which are subscribed to by the users of the managed systems.

When hardware bundles are established, overhead for managing the hardware bundles may be placed upon some of the components of the hardware bundles. This management overhead may cause the actual performance of the hardware bundles (e.g., for performing different types of workloads) to diverge from that expected based on the capabilities of the hardware components of the bundles. To facilitate selection of hardware bundles to service subscriptions, the hardware bundles may be at least partially isolated and characterized for performance. Additionally, confidence levels in the performance characterization may be established based on the level of isolation and testing procedures involved in the characterization process.

Additionally, when hardware bundles are established, the hardware bundles may be evaluated with respect to the level of control over the hardware bundles. For example, when a hardware bundle is initially characterized for performance, it may be treated as a prototype bundle until the level of control over the hardware bundle is validated as being sufficient for subscription management purposes. Prototype hardware bundles that are sufficiently controllable may be treated as production ready hardware bundles. A production ready hardware bundle may be hardware bundle that is likely to be able to be controlled in a manner sufficient to enforce limits on subscriptions provided using the hardware bundles without taking the hardware bundle out of production.

For example, for a hardware bundle to be production ready, it may need to include sufficient functionality to enable it operational performance to be varied over a sufficient range and sufficiently high level of granularity such that its changes in its operation may be used to enforce limits on subscriptions provided using the hardware bundle. For example, if a hardware bundle includes three devices, and two of the devices are only controllable at a device level (e.g., binary on/off), then the hardware bundle may not be production ready because it may not be sufficiently controllable to provide different levels of performance of services across a typical range for services commonly provided using hardware of the types of the three devices.

Accordingly, when bundles are selected for use in servicing subscriptions, the bundles may be likely to be used to modify the performance of services provided to users of managed systems in a manner that conforms the provided services to limits on subscriptions for the services.

After a bundle is selected for service, its performance may be monitored over time. If the performance of the bundle changes (e.g., due to degradation of hardware components, changes in workloads, changes in firmware, etc.) over time in an undesired manner, the operation of the bundle may be updated and/or replaced. For example, if the performance of the bundle falls below that necessary to meet subscription requirements, the operation of the bundle may be updated, for example, by increasing the extent to which portions of the hardware bundle may be used. Accordingly, performance of the hardware bundle in connection with various services may be improved.

By doing so, embodiments disclosed herein may (i) reduce the cognitive burden for selecting and managing systems to provide desired computer implemented services, (ii) may improve the quality of computer implemented services by increasing the likelihood of managed systems being able to provide desired functionalities over time, and/or (iii) facilitating subscription management in distributed systems.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution and/or different solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) track changes in the solution compatibilities of managed systems 20 over time, and (iv) use the tracked changes in solution capabilities to select and deploy changes in solutions provided by managed systems 20.

To deploy a new solution, a software stack (e.g., operating system, applications, drivers, etc.) may be instantiated on one or more managed systems. However, various software stacks may have requirements regarding hardware resources necessary for operation of the software stacks. The tracked changes in the solution capabilities may be used to restrict (e.g., from deployment) software stacks that may be impaired (e.g., entirely or partially) when deployed to a managed system and allow other software stacks that may be unlikely to be impaired when deployed to the managed systems.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities (e.g., over provisioned) than those required to immediately address a request from the requesting entity. The selection may be made on the basis that the requesting entity may be likely to request additional features and/or capabilities in the future. Consequently, managed systems 20, when deployed to a client site (e.g., private or shared datacenter), may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

The distributed system may allow a provider of managed systems 20 to selectively manage various functionalities provided by managed systems 20. For example, the distributed system may allow for different solutions to be provided by managed systems 20 over time. By doing so, a provider of managed systems 20 may tailor the functions provided by managed systems 20 (e.g., from all possible functions) to only those requested, desired, and/or procured (e.g., subscribed to) by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various functionalities, hardware components, and/or software components (e.g., the aggregate being solutions). The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional features to be utilized by the users. However, by virtue of the nature of the distributed system, subscription management service 10 may not have access to accurate capability information for various managed systems. Consequently, subscription management service 10 may make configuration decisions not based on accurate information. To address such configuration decisions, as discussed above, a distributed decision making model may be used so that local subscription managers may automatically take action (i) contrary to requests received from subscription management service 10, and/or (ii) independently from subscription management service 10. By doing so, embodiments disclosed herein may automatically reduce the impact of inaccurate information on the operation of the distribute system.

To allow for users or other persons associated with managed systems to elect into such subscriptions, subscription management service 10 may provide graphical user interfaces that allow such selections to be made. The graphical user interfaces may be implemented, for example, as webpages (or other types of interfaces) accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service. In some cases, the local subscription managers may reject the modifications in operation of managed systems 20, which may prompt subscription management service 10 to reconsider its configuration decisions for managed systems 20.

To facilitate solution selection, the graphical user interfaces presented to the users may present solutions that are compatibility with managed systems 20. The presented solutions may be based on a current configuration and/or capabilities of managed systems 20. Accordingly, the persons tasked with managing managed systems 20 may not need to be aware of the current configuration of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), (iii) code blocks or other information (e.g., lists of actions) usable to revert a previously implemented modification of the operation of a managed system to comply with an elected subscription, and/or (iv) intermediate representations of desired configurations.

The intermediate representations may include functionalities, capabilities (e.g., performance expectations/requirements), and/or other features of a solution to be provided to subscribed users. However, the intermediate representations may not specify the hardware components to provide the solution, the software components, etc. As will be discussed in greater detail below, the distributed management model may vest authority in the local subscription managers to make decisions regarding which hardware and software components to use, and configurations to ensure that the solution is provided to subscribed users.

By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems in a manner that does not rely on or require communication with other entities.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems. For example, the subscription management service may provide information to deployment manager 100 which may in turn manage managed systems 102, 104 based on the information.

To facilitate management, deployment manager 100 may (i) host various software images to facilitate deployment of software necessary for various solutions for managed systems 102, 104, (ii) facilitate identification of solutions compatible with managed systems 102, 104, (iii) provide information regarding the compatible solutions to other entities (e.g., such as the subscription management service), and/or (iv) provide other management functionalities. However, like the subscription management service, deployment manager 100 may operate with inaccurate information regarding the capabilities and/or configurations of managed systems 102, 104. Consequently, the information that it may provide to subscription management service 10 may also be inaccurate.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

Deployment manager 100 may be implemented with a distributed service hosted by any number of managed systems. Thus, while shown separately from managed systems 102-104 in FIG. 1B, it will be appreciated that the functionality of deployment manager 100 may be provided by any of managed systems 20.

Turning to FIG. 1C, a block diagram illustrating managed system 150 in accordance with an embodiment is shown. Managed system 150 may be similar to any of managed systems 20, shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide a solution which may be provided with a software stack hosted by managed system 150. Managed system 150 may be reconfigured by, for example, deploying different software stacks, startup management entities (e.g., basic input output systems (BIOSs), configuration of the operation of hardware/software components, and/or enabling/disabling hardware components.

Figure 6:
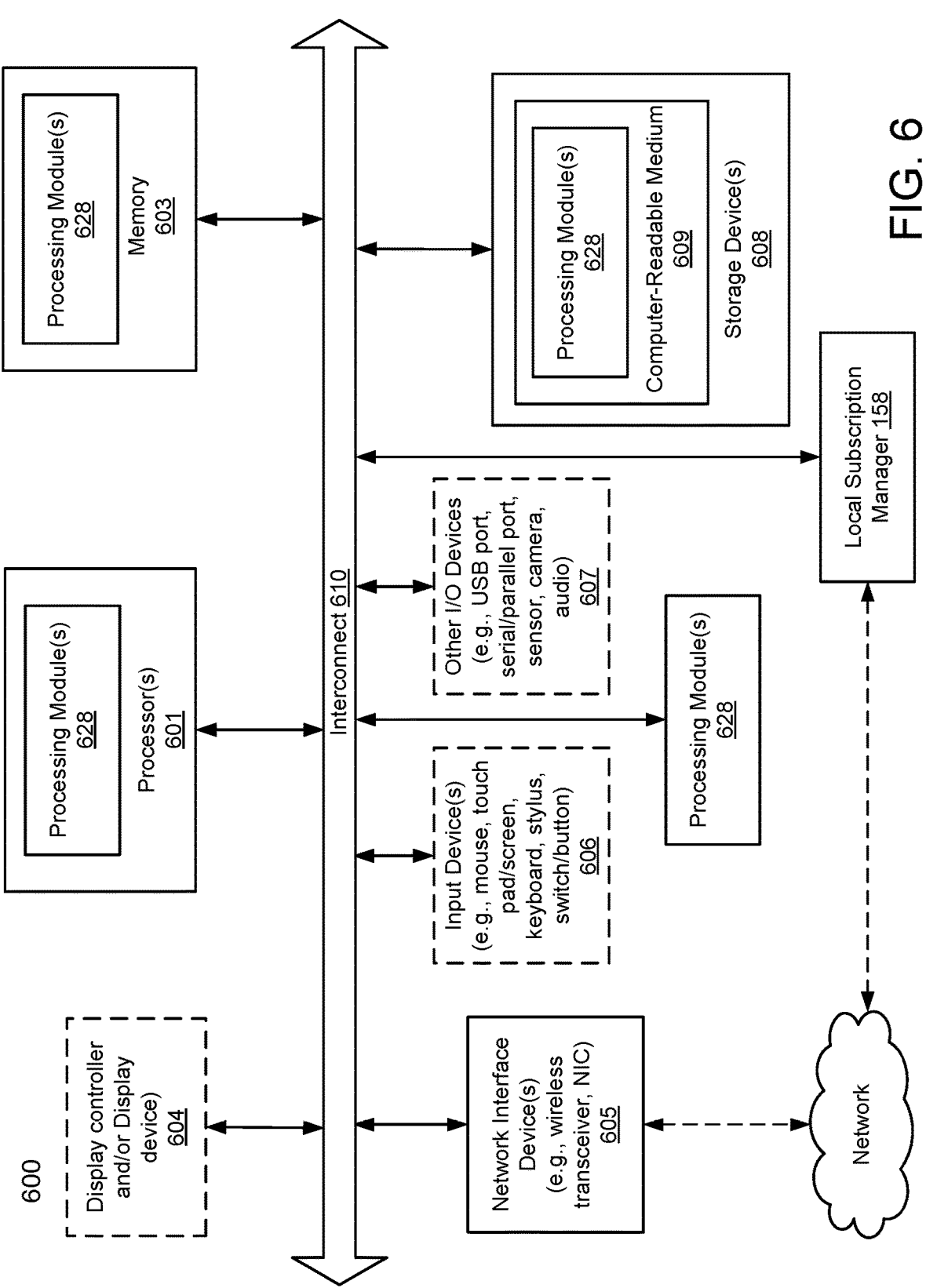
FIG. 6 shows a block diagram illustrating a computing device in accordance with an embodiment.

In addition (and/or alternatively) to any of the components shown in FIG. 6, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154. For example, after managed system 150 is power cycled, managed system 150 may not be in a state in which application 154 may operate. To enter the operating state, managed system 150 may perform any number processes such as (i) a power on self-test, (ii) performing an inventory of hardware resources 156, and (iii) beginning execution of and/or handing off operation management of managed system 150 to operation manager 152. Startup manager 151 may be implemented with, for example, a basic input output system (BIOS) or other type of startup management entity.

Operation manager 152 may generally manage operation of the component of managed system 150, except for local subscription manager 158. For example, operation manager 152 may be implemented with an operating system used to manage hardware resources 156 of managed system 150 to facilitate execution of applications 154.

To facilitate dynamic changes in solutions provided by operation manager 152 and/or applications 154, local subscription manager 158 may facilitate automatic deployment of software stacks and/or startup managers to managed system 150. The deployed software stacks may include all, or a portion, of operation manager 152 and applications 154. To ensure that only software stacks compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150. Further, local subscription manager 158 may use the current information to determine whether to honor or rejection subscription updates to prevent configurations for the managed system 150 that may impair its operation (or require it to perform various actions that it cannot fulfill) from being enforced on managed system 150.

To facilitate management of hardware resources 156, local subscription manager 158 may bundle various types of hardware resources 156 together for subscription purposes. For example, hardware resources 156 may include direct management hardware resources 156A and indirect management hardware resources 156B.

Direct management hardware resources 156A may include hardware devices that include functionality to selectively limit their use. For example, direct management hardware resources 156A may include controllers, data processing units, communication chips, and/or other types of devices that may be configured to allow or disallow use of their functionalities. These resources may be directly managed by local subscription manager 158 via, for example, sideband communications through which local subscription manager 158 may directly modify the operation of these devices.

In contrast, indirect management hardware resources 158B may include hardware devices that do not include functionality to selectively limit their use. As a consequence, local subscription manager 158 may not be able to use sideband communications (or other types of communications) to modify how these hardware resources operate directly. As will be discussed in greater detail below, local subscription manager 158 may bundle some direct management hardware resources 156A with other indirect management hardware resources 156B such that the functionality of the bundle, as a whole, may be directly managed by local subscription manager. Refer to FIGS. 1E-1I for additional details regarding managing the functionality of hardware bundles to facilitate subscription enforcement.

Figure 1D:
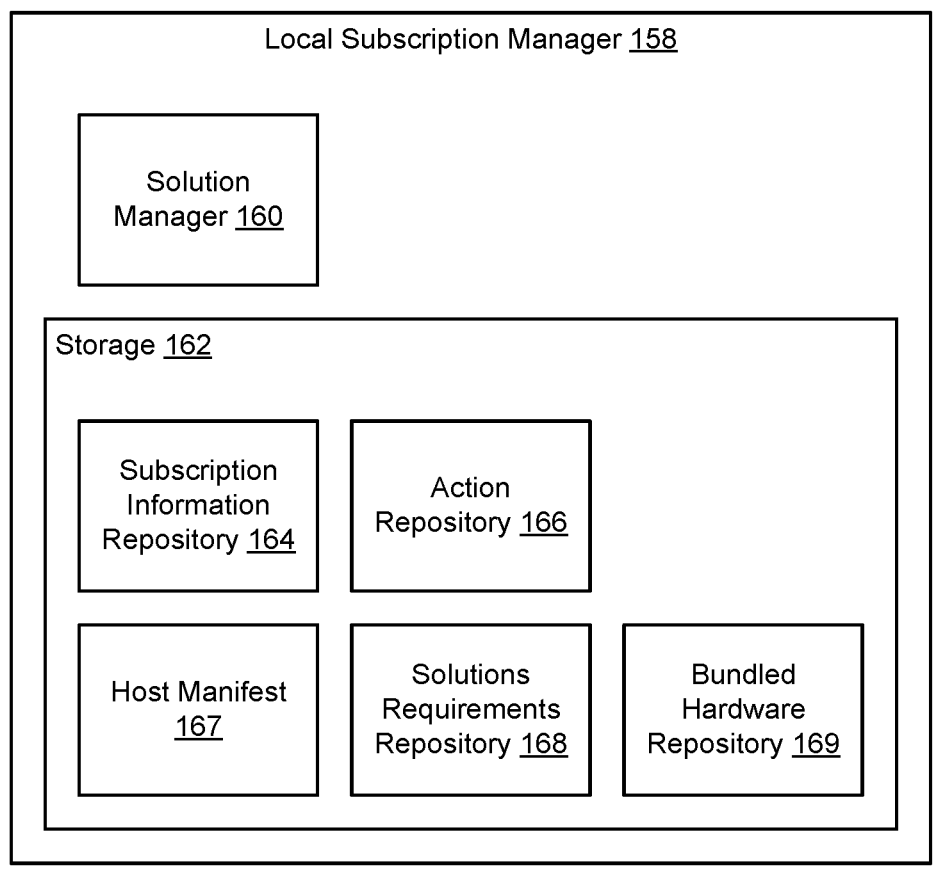
FIG. 1D shows a block diagram illustrating a local subscription manager in accordance with an embodiment.

When bundling hardware resources into hardware bundles, local subscription manager 158 may characterize the likely performance of the bundles (e.g., via estimation based on workload testing). When doing so, local subscription manager 158 may implement various isolation processes on the bundled hardware to attempt to remove influence of other hardware resources on the performance of the hardware bundle. Because complete isolation may not be possible, confidence estimates for the performance estimates may also be established based on, for example, the extent to which a hardware bundle may be isolated, the particular workload tests performed to estimate performance of the bundle, and/or other factors. Refer to FIGS. 1G-1H for additional details regarding estimating the performance of bundled hardware.

Additionally, when bundling hardware resources, local subscription manager 158 may verify that the hardware bundles (e.g., the prototype hardware bundles) are sufficiently controllable (e.g., production ready hardware bundles) to enforce subscription limits. Prototype hardware bundles that are insufficiently controllable may not be promoted to production ready hardware bundles, and the hardware resources of such hardware bundles may be released for re-bundling with other hardware resources. Refer to FIG. 1I for additional details regarding re-bundling hardware resources.

After bundling hardware resources, local subscription manager 158 may monitor the performance of the hardware bundles over time. The operation of the hardware bundles may be modified over time to retain the performance of the hardware bundles within predetermined ranges corresponding to, for example, services level agreements (and/or other criteria) for subscribed to services, solutions, etc.

For example, when a hardware bundle is established, the performance of the hardware bundle may be modified to limit it within subscribed to ranges of performance. These limits may be enforced by directly management hardware components of the hardware bundles. If the monitored performance of the hardware bundles falls outside of the performance ranges, then the operation of the hardware bundles may be updated by, for example, reducing restrictions imposed on the operation of the hardware bundles. Reducing the restrictions may result in improved performance thereby returning the performance of the hardware bundles to the subscribed to ranges.

Figure 5A:
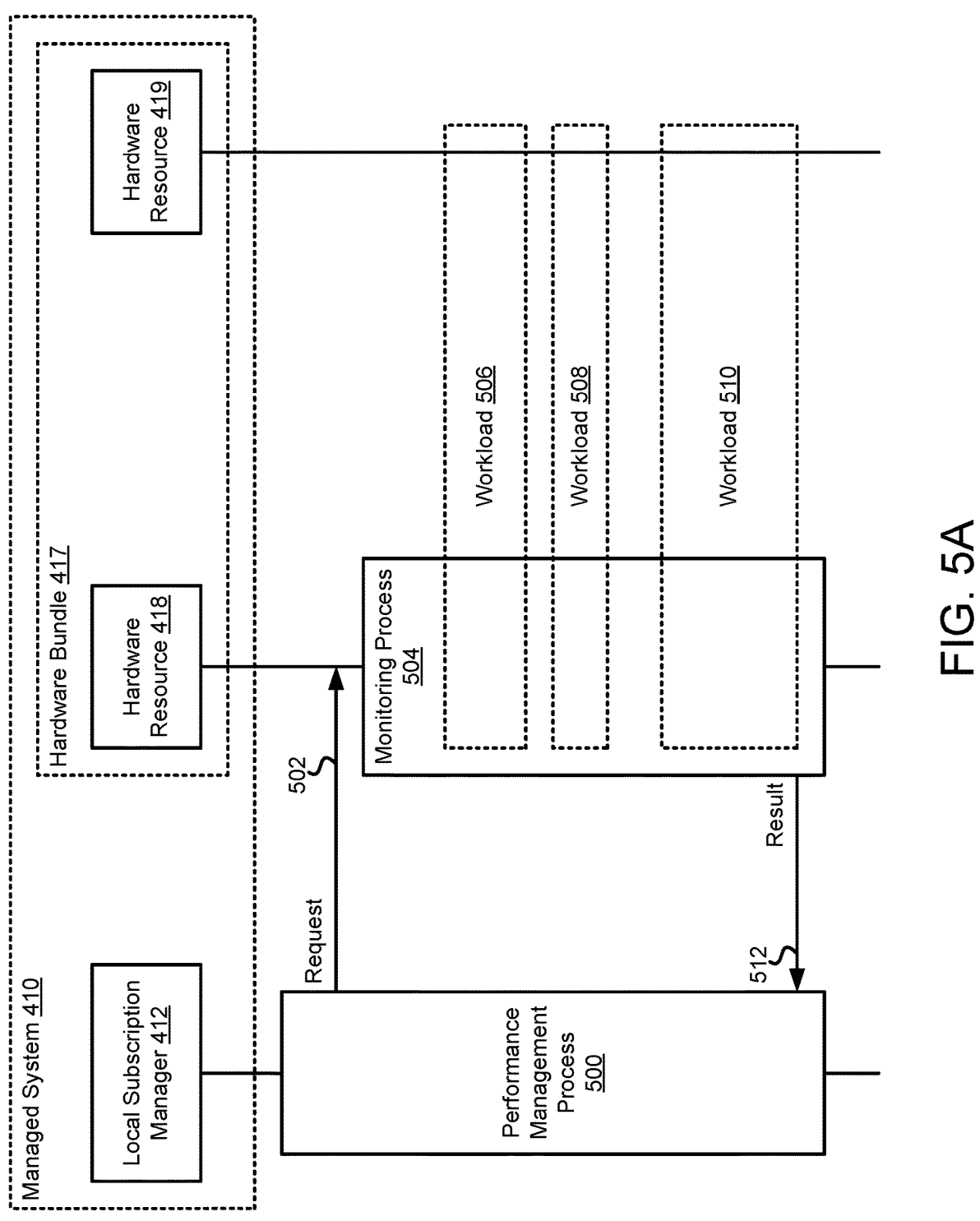
Figure 5B:
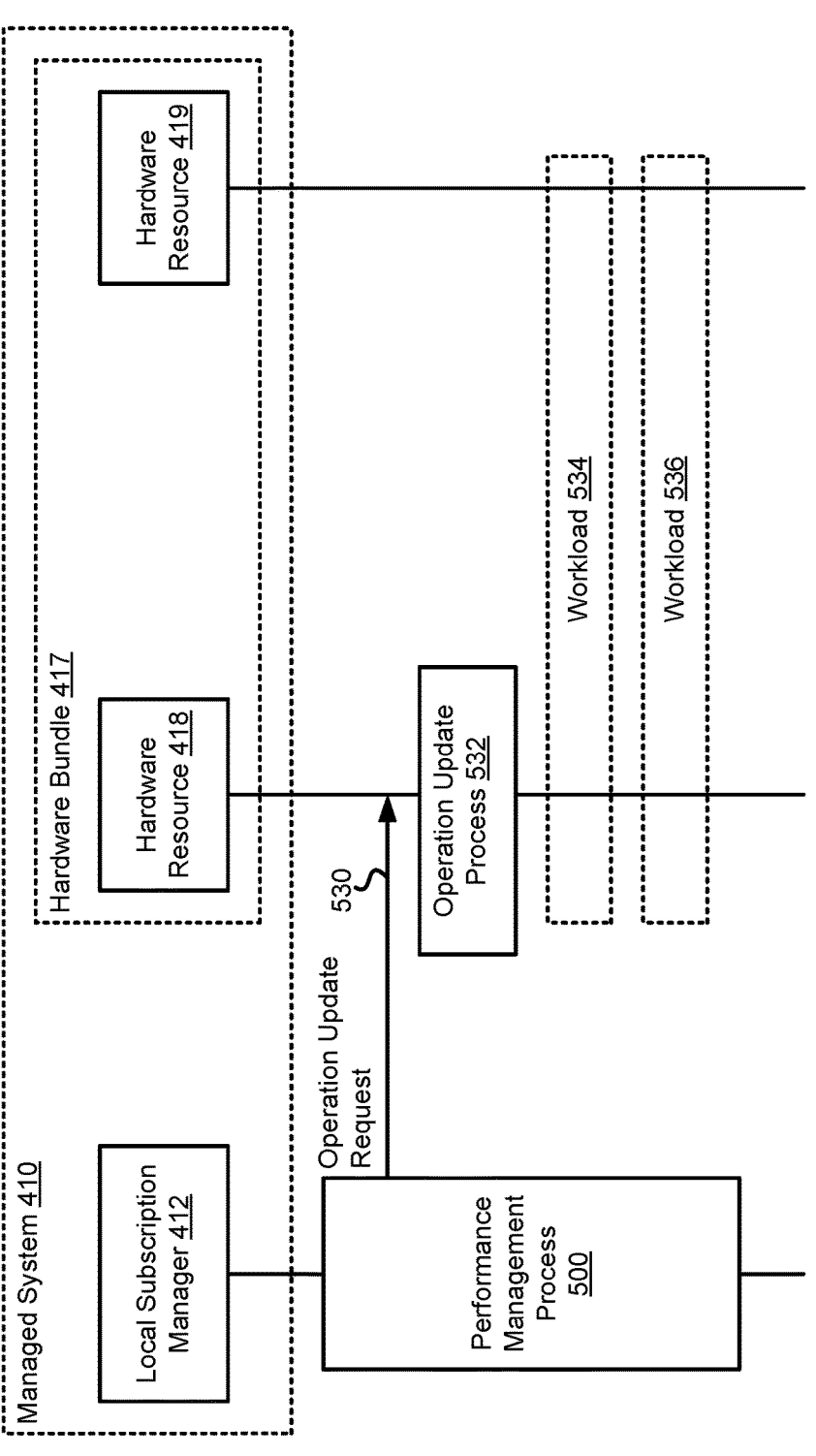

The restrictions may be reduced by, for example, expanding communications between components, powering portions of hardware components of a bundle that were depowered, enabling certain software code that facilitates improved use of the hardware components, etc. These restrictions may be imposed by the directly manageable hardware components (e.g., also referred to as direct management hardware components) on indirectly manageable hardware components (e.g., also referred to as indirect management hardware components). Refer to FIGS. 5A-5B for additional information regarding monitoring and updating of operation of hardware bundles.

Applications 154 may provide all, or a portion, of the computer implemented services desired by a user, operator, or other person associated with managed system 150. Applications 154 may utilize hardware resources 156 to provide their respective functionalities. The type and quantity of applications 154 that may be hosted by managed system 150 may depend on hardware resources 156 (e.g., types and quantity of hardware devices). Thus, the functionalities provided by a managed system may be limited by enforcing use limits on hardware resources 156.

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as capabilities of hardware resources 156.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

Various changes in subscriptions may cause various portions of hardware resources 156 to be enabled or disabled, as discussed above, at the resource or bundle level. Consequently, even though physical hardware may be present in managed system 150, some of the physical hardware may not be usable (or usable at lower levels of efficiency due to changes in operation of hardware bundles) even though it could be usable. Accordingly, information regarding the physical hardware of managed system 150 may not be used to accurately determine the actual capabilities of managed system 150, since any quantity of hardware resources 156 may not actually be usable.

Local subscription manager 158 may provide subscription management services. Subscription management services may include (i) obtaining information regarding subscriptions, (ii) implementing the subscriptions by enabling/disabling hardware resources (e.g., at the individual resource and/or bundle level), deploying software instances, etc., and (iii) establishing and using hardware bundles of hardware resources 156 to force compliance with subscription limitations. Refer to FIG. 1D for additional information regarding local subscription manager 158.

Local subscription manager 158, subscription management service 10, and/or deployment manager 100 may cooperate to enforce subscriptions on managed system 150. Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software component of managed system 150. For example, the management controller may include functionality to load software stacks on managed system 150, obtain information regarding hardware resources 156, modify operation of hardware resources 156, etc.

In an embodiment, the management controller includes a separate communication interface (e.g., from that of a communication interface of managed system 150) through which it communicates with subscription management service 10, deployment manager 100, and/or hardware resources 156. In an embodiment, the management controller uses the same communication interface which managed system 150 uses to communicate with other devices. Either of these communication interface may facilitate communications with communication system 30, and devices connected to communication system 30 such as subscription management service 10 or deployment manager 100. The management controller may present itself as a separate device to other entities (e.g., which may be associated with its own network endpoint).

When providing its functionality, local subscription manager 158 may perform all, or a portion, of the methods and operations illustrated in FIGS. 2A-5B. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 6. In addition (and/or alternatively) to any of the components shown in FIG. 6, local subscription manager 158 may include solution manager 160 and storage 162. Each of these components is discussed below.

Solution manager 160 may include functionality to (i) obtain information regarding hardware resources of a host managed system, (ii) establish hardware bundles to facilitate compliance with subscriptions, (iii) enable/disable hardware bundles and/or individual hardware resources to enforce subscription limits, and/or otherwise modify the operation of a host managed system to enforce compliance with subscriptions.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164, action repository 166, host manifest 167, solution requirements repository 168, and bundled hardware repository 169. Each of these data structures is discussed below.

Subscription information repository 164 may be implemented with one or more data structures that store information regarding subscriptions for a managed system that hosts local subscription manager 158. The information may include, for example, the subscriptions to be enforced on the host managed system, limitations on the subscriptions (e.g., duration based, use based, etc.), and/or disablement actions for the subscriptions. The disablement actions may be implemented with code blocks that may be pushed to the host managed system for execution. When executed, the host managed system may perform the disablement actions which may, for example, cause various hardware/software components to be enabled/disabled, and/or reconfigured (e.g., through reformatting of storage device, modification of settings, etc.). Likewise, the disablement actions may cause hardware bundles to change their operation to comply with subscription limitations.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

Host manifest 167 may be implemented with one or more data structures that store information regarding hardware resources of a host managed system. The information may include, for example, a list of hardware devices, the type of each hardware device, capabilities of each hardware devices, whether the hardware devices is a direct and/or indirect management device, and/or other information regarding the hardware resources of the host managed system. Host manifest 167 may be updated over time to ensure that it is likely to include accurate information.

Solution requirements repository 168 may be implemented with one or more data structures that store information regarding hardware resource requirements for any number of solutions (e.g., to which a host managed system may be subscribed). The information may include, for example, a list of solutions and corresponding hardware resources required for each of the solutions including, for example, list of hardware devices, the type of each hardware device, capabilities of each hardware device, and/or other information regarding the hardware resources that should be available for a solution to be implemented by a managed system.

The information included in solution requirements repository 168 may be flexible and provide a variety of different hardware options that may allow for a solution to be performed. Consequently, when a subscription for a solution is obtained, solution manager 160 may find a best fit to the hardware resources of a host managed system. Thus, when a subscription for a solution is obtained, the subscription may not specify the hardware to be used to implement the solution. Rather, the subscription may define an intermediate representation of goals, outcomes, criteria, etc. for ascertaining whether the solution has been provided. Solutions requirements repository 168 may include information that allows for a broad variety of different hardware resources to be used to enable solution to be provided by different managed systems have different hardware resources.

Bundled hardware repository 169 may be implemented with one or more data structures that store information regarding hardware resources (e.g., direct/indirect management) that have been bundled together. The information may include, for example, (i) hardware resources that are members of each hardware bundle, (ii) performance levels of each hardware bundle, (iii) confidence levels in the performance levels of the bundled hardware, (iv) information regarding workload tests to be performed on different types of bundled hardware, (v) plans for isolating various types of hardware resources, (vi) assumptions and/or other information regarding the plans for isolating the types of hardware that indicate levels of confidence to have in the results (e.g., performance estimates) of the workload tests, (vii) information regarding levels of control over the hardware bundles, (viii) information regarding restrictions place on hardware bundles to limit functionality of hardware bundles to meet subscription limits, and/or (ix) solutions being provided using the hardware bundles, etc.

For example, the workload test may specify different types of workloads to be performed by bundled hardware. The workload tests may be keyed to different types of hardware resources thereby allowing for workload tests to be looked up based on the types of hardware resources included in a bundle. It will be appreciated that the workload tests may be keyed to other types of information regarding bundled hardware without departing from embodiments disclosed herein. The workload tests may define workloads to be performed, monitoring processes for the workloads, and performance estimates based on the results of the monitoring.

Further, the plans for isolating various types of hardware may specify how operation of other hardware resources are to be modified to isolate bundled hardware during performance of the workload tests. For example, that plans may specify changes in communications processes (e.g., screening communications), changes in how hardware resources are to be powered (e.g., depowering other hardware resources not involved in bundled hardware under test), suspension of various other processes (e.g., applications) during the workload tests, etc.

The assumptions and/or other information may be used to identify levels of confidence to have in the resulting workload tests. For example, the assumptions and/or other information may indicate how levels of confidence in the performance estimates may vary depending on, for example, (i) the extent to which the plans for isolating various types of hardware are implemented, (ii) deviations from the plan, and/or (iii) levels of confidence in the performance estimates obtained from the workload testing when the plans are fully implemented. Accordingly, the assumptions and/or other information (e.g., collectively "confidence level information) may be used to identify confidence levels in the performance estimates. The confidence levels may be specified, for example, with respect to a scale (e.g., 0% to 100%).

For example, confidence levels may be keyed to the types of workload performance testing, and/or levels of compliance with/deviation from the plans for isolating the various types of hardware. Consequently, lookups may be performed to identify the confidence levels (e.g., which may be previously established by a subject matter expert, automated process, etc.).

The information regarding limitations placed on hardware bundles may include, for example, (i) information regarding all possible limitations that may be placed on the hardware bundles, (ii) information regarding the actual limitations in place on the hardware bundles, and/or (iii) performance expectations for the hardware bundles based on the actual limitations (e.g., may be established using modeling, testing as part of bundle establishment, etc.). For example, when a hardware bundle is established, it may be used to provide subscribed services. The subscribed services may include descriptions of expectations regarding the quality (e.g., rate, type, etc.) of the services. If a hardware bundle is allocated to provide the subscribed to services, the performance of the hardware bundle may exceed that necessary to meet the expectations regarding the quality of the services. The performance of the hardware bundle may be tuned by imposing various restrictions on operation of the hardware bundle to match the quality of provided services to that expected for the subscribed to services. This information may be used over time as a basis for comparison to ascertain whether the hardware bundle is able to continue to provide the services at a quality level agreed to in one or more subscriptions.

It will be appreciated that bundled hardware repository 169 may include information regarding prototype hardware bundles and/or production ready hardware bundles. The information regarding prototype hardware bundles that are not promoted may be retained so that similar prototype hardware bundles are unlikely to be generated in the future. For example, when hardware is bundled into a prototype hardware bundle, the potential hardware members of the prototype bundle may be screened based on the combinations of hardware resources of prototype hardware bundles that failed to be promoted (e.g., were insufficiently controllable).

While various data structures have been illustrated in and described with respect to FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

As discussed above, to enforce subscription limits on managed systems, hardware bundles may be established. To establish the hardware bundles, the local subscription managers may characterize the ability of direct management hardware components to influence the operation of indirect management hardware components. FIGS. 1E-1H show diagrams illustrating examples of how hardware bundles may be established in accordance with an embodiment. For brevity, only a limited number of components of the managed system 170 is shown in these figures.

Figure 1E:
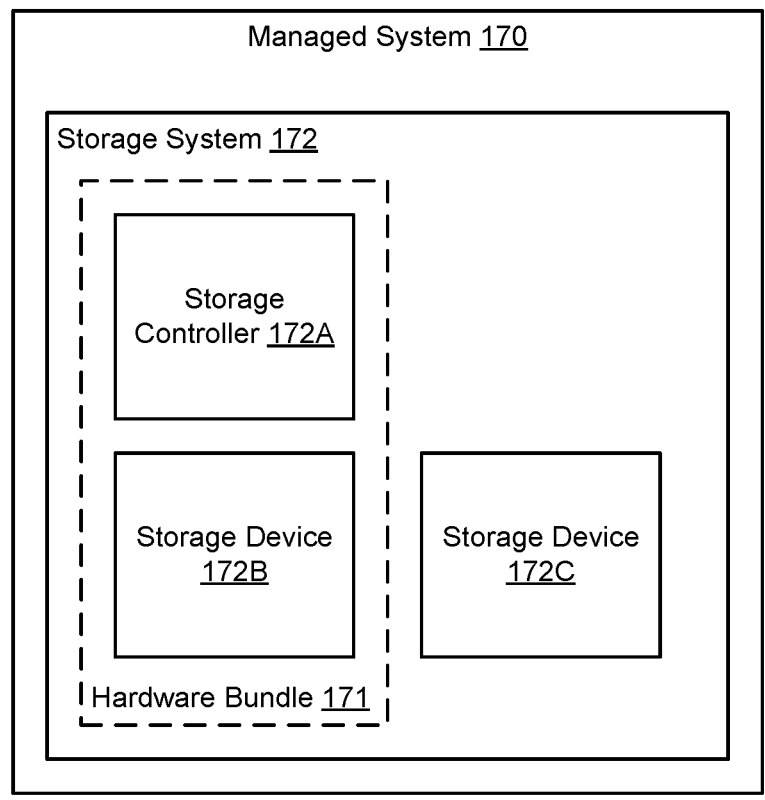
FIGS. 1E-1I show block diagrams illustrating example managed systems in accordance with an embodiment.

Turning to FIG. 1E, a first block diagram of managed system 170 in accordance with an embodiment is shown. Managed system 170 may be similar to any of managed systems 20.

To provide storage services, managed system 170 may include storage system 172. Storage system 172 may include storage controller 172A (e.g., that manages storage of data in storage devices 172B-172C), storage device 172B (e.g., a hard disk drive), and storage device 172C (e.g., another hard disk drive).

Storage controller 172A may be an example of a direct management hardware components because it may include functionality to limit its operation. For example, storage controller 172A may include functionality to limit its operation, limit communications with other components (e.g., selectively drop communications, prevent device discovery from occurring, etc.), to interrogate/modify communications, etc. at the direction of a local subscription manager.

In contrast, storage devices 172B-172C may be example of indirect management hardware components because neither may include functionality to limit their operation based on instructions from a local subscription manager. For example, storage devices 172B-172C may not include sideband interfaces or other mechanisms to communicate with local subscription managers, may not include software or other capability to modify their operation based on instructions from local subscription managers, etc.

However, storage devices 172B-172C may be indirectly controlled by storage controller 172A. For example, storage controller 172A may be in a communication path between the storage devices and other hardware components. Thus, storage controller 172A may limit the functionalities of the storage devices by limiting their ability to communicate with other devices.

To manage the functionalities of managed system 170 to force compliance with subscription limitations, hardware bundle 171 may be established by the local subscription manager. Hardware bundle 171 may be a logical mapping between the capabilities of storage device 172B and the limitations in its operation that may be imposed on it using the functionalities of storage controller 172A. For example, the logical mapping may map use of some of the storage resources (e.g., hardware block addresses) to various abilities of storage controller 172A to limit addressable ranges. Thus, when the capabilities of storage device 172B are presented to other devices via storage controller 172A, some of the hardware block address range of storage device 172B may be concealed thereby disallowing use of some of the capabilities of storage device 172B. While described with respect to address range to limit use of some of the storage space of storage device 172B, it will be appreciated that other capabilities of storage device 172B may be selectively masked by storage controller 172A (e.g., by artificially constraining bandwidth, introducing artificial latency, constraining the rate at which individual operations may be performed, etc.).

Once established, hardware bundle 171 may be used to enforce subscription limits on managed system 170. For example, when subscription limits are reached, the logical mapping may be used to limit use of the storage resources presented by storage device 172B.

Figure 1F:
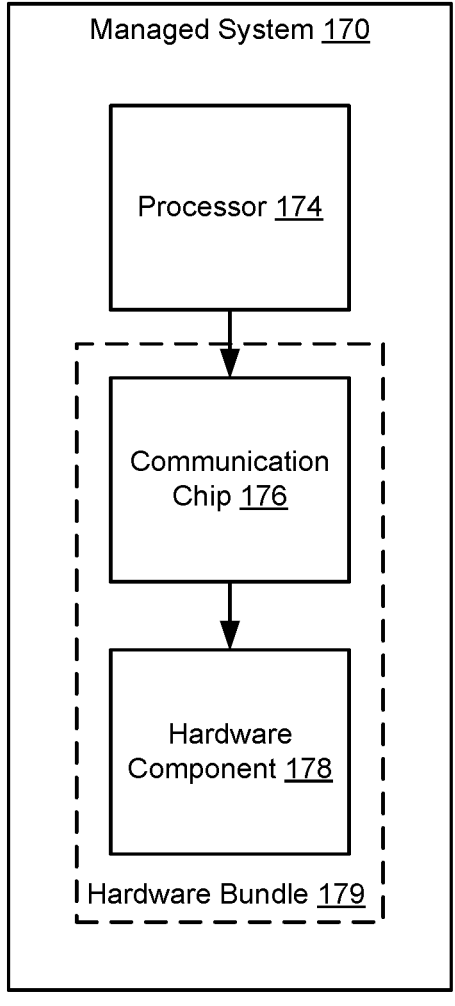
Figure 1G:
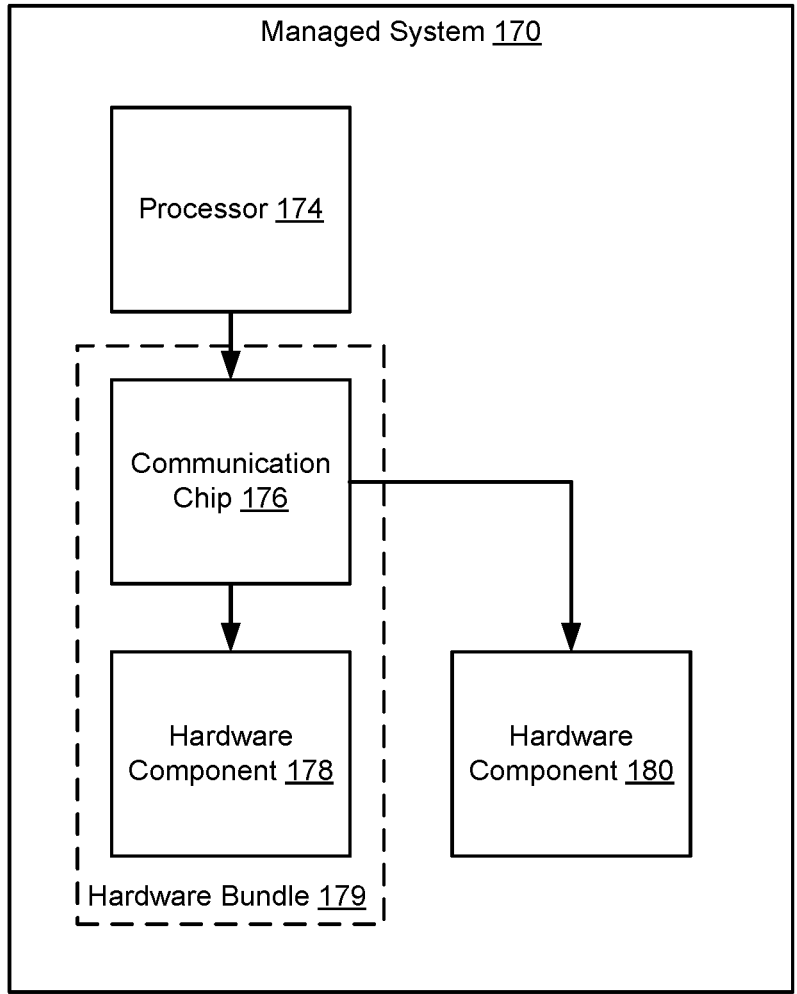
Figure 1H:
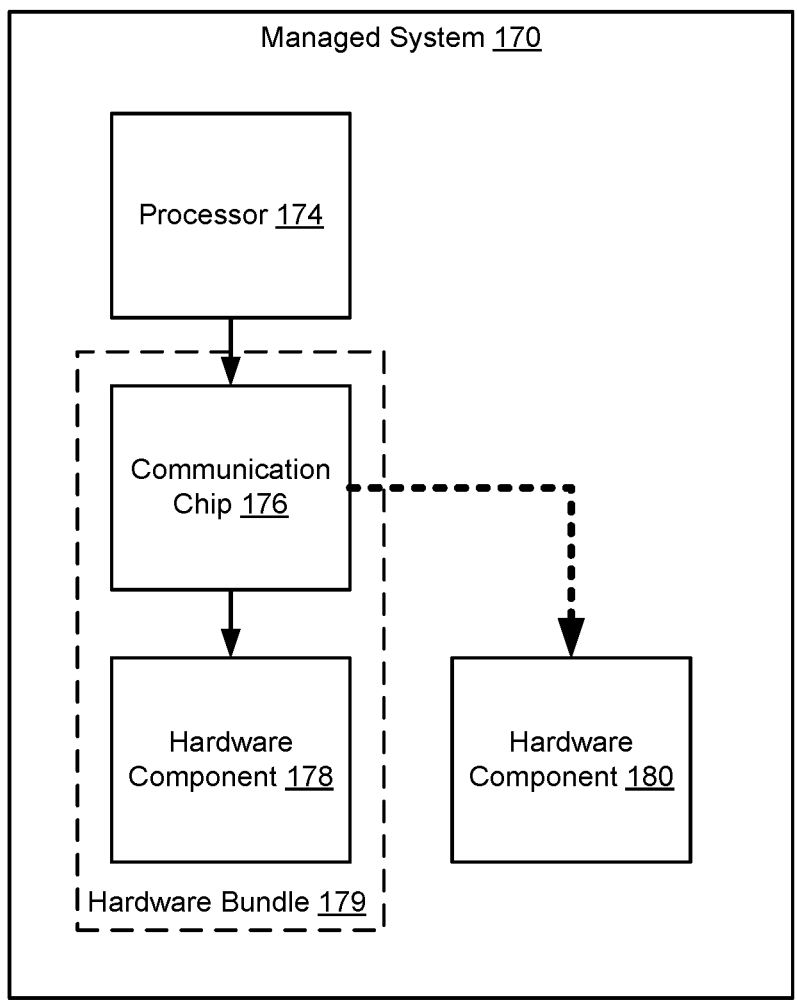
Figure 1I:
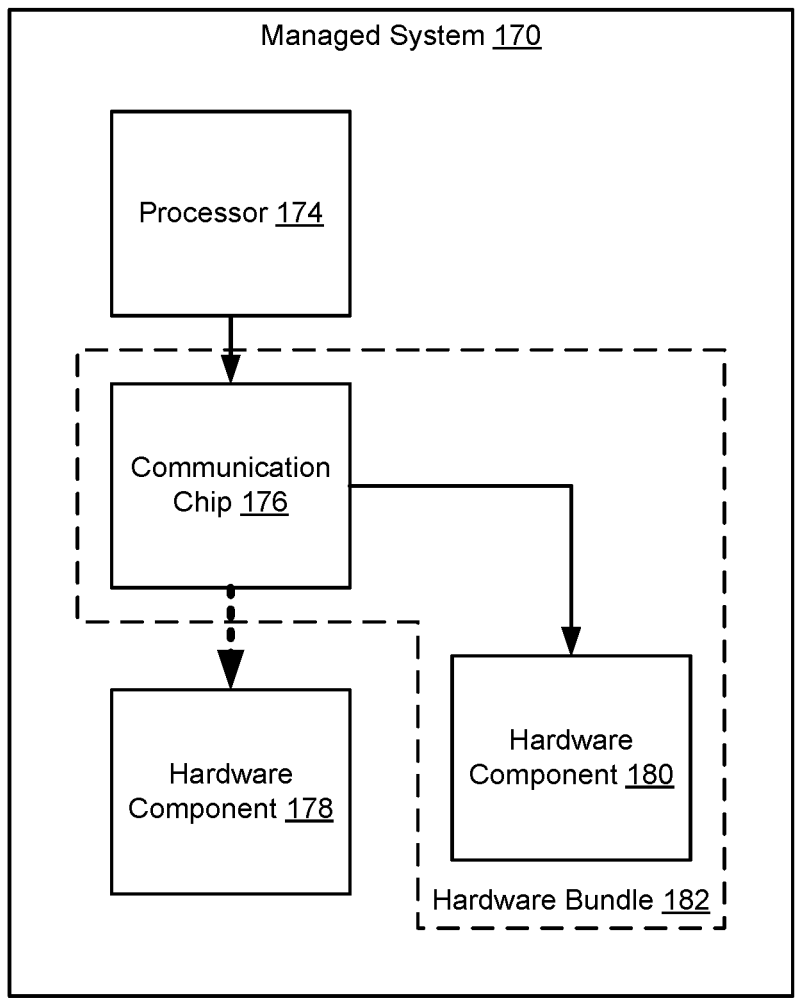

Turning to FIG. 1F, a second block diagram of managed system 170 in accordance with an embodiment is shown. Managed system 170 may be similar to any of managed systems 20.

To provide data processing services, managed system 170 may include processor 174, communication chip 176, and hardware component 178. Hardware component 178 may be a special purpose hardware device to accelerate certain types of processing, while processor 174 may be a general purpose processor that may offload the types of processing to hardware component 178. To facilitate communications between these devices, communication chip 176 may be positioned to establish a bus or point to point communication link that allows processor 174 to offload processing to hardware component 178.

Communication chip 176 may be an example of a direct management hardware components because it may include functionality to limit its operation. For example, communication chip 176 may include functionality to limit its operation, limit communications with other components, to interrogate/modify communications, etc. at the direction of a local subscription manager.

In contrast, hardware component 178 may be an example of an indirect management hardware components because it may not include functionality to limit its operation based on instructions from the local subscription manager. For example, hardware component 178 may not include sideband interfaces or other mechanisms to communicate with local subscription managers, may not include software or other capability to modify their operation based on instructions from local subscription managers, etc.

To manage the functionalities of managed system 170 to force compliance with subscription limitations, hardware bundle 179 may be established by a local subscription manager. Hardware bundle 179 may be a logical mapping between the capabilities of hardware component 178 and the limitations in its operation that may be imposed on it using the functionalities of communication chip 176. For example, the logical mapping may map use of certain processing functions of hardware component 178 to various abilities of communication chip 176 to facilitate or limit communications between processor 174 and hardware component 178. Thus, when the capabilities of hardware component 178 are attempted to be used by processor 174, communication chip 176 may selectively block use of the processing capabilities by, for example, preventing establishment of communication sessions, dropping certain types of traffic (e.g., associated with different types of processing), by modifying discovery information regarding hardware component 178, and/or via other mechanisms.

Once established, hardware bundle 179 may be used to enforce subscription limits on managed system 170. For example, when subscription limits are reached, the logical mapping may be used to limit (e.g., reduce rate at which workloads may be offloaded) and/or prevent processor 174 from offloading workloads to hardware component 178.

However, to select whether to use hardware bundle 179 (or 171) to service a subscription, the performance of a hardware bundle may need to be known. Estimating the performance of the hardware bundle based on the underlying hardware resources that have been bundled may introduce significant inaccuracies. To better estimate the performance of the hardware bundle, workload testing may be performed as noted above.

During the workload testing, various plans to isolate the hardware bundle may be performed to better estimate the likely performance of the bundle.

For example, turning to FIG. 1G, a third block diagram of managed system 170 in accordance with an embodiment is shown. As seen in FIG. 1G, communication chip 176 may, in an example embodiment, support communications between processor 174 and hardware component 180. Consequently, if a workload performance test is performed on hardware bundle 179, the use of communication chip 176 to support operation of hardware component 180 may mask the true performance of hardware bundle 179.

For example, if hardware component 178 and hardware component 180 are graphics processing units utilized by processor 174, processor 174 may offload significant workloads to hardware component 180 resulting in significant resources of communication chip 176 being consumed for activity that will not be performed by hardware bundle 179. If workload testing for hardware bundle 179 is performed during the offloading, the performance estimates from the new workload tests may underestimate the actual performance of hardware bundle.

For example, communication chip 176 may constrain the operation of hardware component 178 by not being able to send it data from processor 174 sufficiently quickly to allow hardware component 178 to operate at its maximum or nominal rate. Thus, the results of workload testing may indicate that the performance of hardware bundle 179 is actually less than the maximum potential performance of hardware bundle 179 (e.g., if all of the resources of hardware bundle 179 are dedicated to servicing a subscription).

To manage workload testing, plans for isolating hardware bundle 179 may be performed. The plans may at least temporarily isolate hardware bundle 179 from influence of other hardware resources.

For example, turning to FIG. 1H, a fourth block diagram of managed system 170 in accordance with an embodiment is shown. The fourth block diagram may graphically illustrate a result of performance of a plan to isolate hardware bundle 179. The result may be to eliminate communications from communication chip 176 to hardware component 180 (e.g., visually indicated by the line between communication chip 176 and hardware component 180 being drawn in dashing, rather than with a solid line as shown in FIG. 1G.

The plan may include any number of sub-plans, the sub-plans including (i) suspending workloads by processor 174 that involve hardware component 180, (ii) screening (e.g., dropping) communications received by communication chip 176 and that are directed to hardware component 180, (iii) at least temporarily depowering hardware component 180, (iv) blocking discovery of hardware component 180 by processor 174, and/or other sub-plans for removing influence of hardware component 180 on hardware bundle 179 during workload testing of hardware bundle 179.

During workload testing, different sub-plans (and/or combinations of sub-plans) may be performed to establish sub-estimates for the workload testing. The sub-estimates may then be combined (e.g., averaged, weighted averaged, other statistical combinations) to obtain a workload performance estimate for hardware bundle 179 under a workload test. Any number of separate workload tests may be performed to obtain any number of corresponding estimates, which may be similarly combined to obtain a performance estimate for hardware bundle 179.

Once the workload testing is complete, and presuming that the resulting performance meets certain thresholds or other criteria, the hardware bundle may be treated as a prototype hardware bundle. The prototype hardware bundle may then be subjected to control testing to ascertain whether it is sufficiently controllable. For example, various functions of the direct management hardware components may be utilized to ascertain whether the functionalities of the indirect hardware management components may be controlled with various degrees of fidelity. The level of control over the prototype hardware bundle may be compared to thresholds or other criteria to qualify whether the protype hardware bundle is sufficiently controllable for promotion to production ready hardware bundle.

If insufficiently controllable, then the prototype hardware bundle may be subjected to re-bundling where the hardware components are released and re-bundled.

Turning to FIG. 1I, a fifth block diagram of managed system 170 in accordance with an embodiment is shown. The fifth block diagram may illustrate a result of release and re-bundling of hardware bundle 179 (e.g., FIG. 1H).

As seen in FIG. 1I, hardware component 178 and communication chip 176 may have been released, and a new hardware bundle 182 may have been established using communication chip 176 and hardware component 180.

Once the new prototype hardware bundle is obtained, it may be subjected to similar performance testing as described with respect to FIGS. 1G-1H, and controllability analysis. In FIG. 1I, the line between communication chip 176 and hardware component 178 is drawn in dashing to illustrate the isolation, similarly to the isolation of hardware bundle 179 discussed with respect to FIG. 1H.

If sufficiently controllable, hardware bundle 182 may be promoted to production ready status. As part of the promotion, the performance of the hardware bundle may be characterized, and used as a basis for selection in providing subscribed to services.

When selected, the performance of the hardware bundle may be tuned by imposing limits on the operation of the hardware bundle. For example, in FIG. 1I various restrictions on operation of communication chip 176 may be imposed. These restrictions may reduce the level of performance of operation of the bundle as a whole.

For example, firmware may be deployed, configurations may be changed, and/or other changes in operation of the hardware bundle may be made to tune the performance of the hardware bundle (e.g., downward) to reduce the performance of the hardware bundle to match that specified by various subscriptions. By tuning the performance at the hardware level (e.g., as opposed to the application/software level hosted by processor 174), a malicious user of managed system 170 may be less likely to obtain performance in excess of that subscribed to by the users of managed system 170. For example, bypassing software limits imposed on software hosted by processor 174 may be more easily circumvented than limits imposed by the hardware of hardware bundles.

The limits imposed by the hardware bundles may be imposed through use of sideband communications from local subscription managers of managed systems. By using bare metal communications, and hardware level controls, the operation limits imposed on hardware bundles may be less likely to be bypassed. For example, from the perspective of the software hosted by processor 174, the performance provided by the hardware bundles may appear to be nominal and opaque to these entities.

Thus, as seen in FIGS. 1G-1I, hardware bundles may be established and verified, prior to promotion to production ready hardware bundles. Once established, the hardware bundles may be tuned to provide varying levels of performance, and may be used to provide subscribed to solutions, services, etc. with commensurate levels of hardware performance.

As discussed above, the components of FIG. 1A may perform various methods to provide computer implemented services using managed systems that may provide respective solutions limited based on the hardware resources of the respective managed systems. FIGS. 2A-3B illustrate examples of methods that may be performed by the components of FIG. 1A. For example, a local subscription manager of a managed system, a deployment manager, and/or a subscription management service may perform all or a portion of the methods. In the diagrams discussed below and shown in FIGS. 2A-3B, any of the operations may be repeated, performed in different orders, and/or performed in parallel with or in a partially overlapping in time manner with other operations.

Figure 2A:
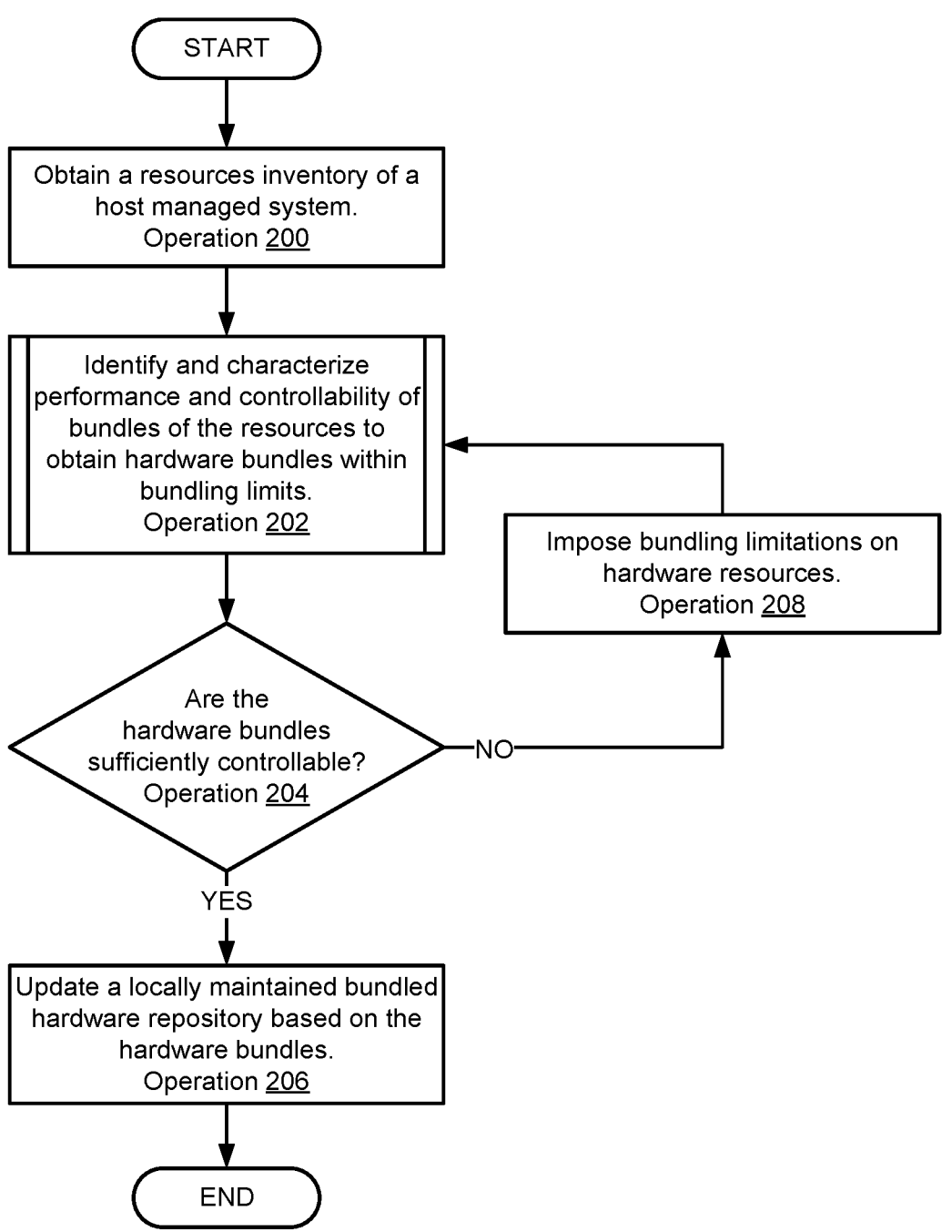
FIGS. 2A-3B show flow diagrams illustrating method in accordance with an embodiment.

Turning to FIG. 2A, a first flow diagram illustrating a method of updating a bundled hardware repository in accordance with an embodiment is shown. The method illustrated in FIG. 2A may be performed by any of the components of the system of FIG. 1A.

At operation 200, a resources inventory for a host managed system is obtained. The resources inventory may be obtained by a local subscription managed hosted by the managed system. The resources inventory may be obtained from a startup manager of the managed system. For example, the startup manager may perform a hardware inventory as part of starting up the host managed system.

In an embodiment, the resources inventory specifies (i) hardware components (all or a portion) of the host managed system, (ii) type information for the specified hardware components, (iii) capability information for the specified hardware components (e.g., how quickly data can be provided to or processed by hardware components), (iv) connectivity information for the hardware components (e.g., which components are connected to other components), and/or (v) other types of information usable to classify or characterize hardware components of a host managed system.

The resources inventory may also include information regarding software components such as, for example, firmware hosted by hardware components, software stacks hosted by a managed system, etc.

In an embodiment, the resources inventory is obtained by sending a request, an interrupt, or other type of communication to the startup manager via an interconnect with which a local subscription manager is operably connected to one or more processors executing instructions (e.g., computer instructions) corresponding to the startup entity. The startup entity may provide the resources inventory and/or information usable by the local subscription manager to obtain the resources inventory. The resources inventory may also be obtained by sending a request to an operation manager which manages various software stacks. The operation manager may provide information regarding these components.

At operation 202, potential hardware bundles may be identified and characterized using the resources inventory. The potential hardware bundles may be identified based on similarities between the hardware components (e.g., specified by the resources inventory), connectivity between the hardware components, management overhead targets, levels of risk presented by bundling different hardware components, regularity of use of different hardware components, and/or other factors.

In an embodiment, the potential hardware bundles are established by identifying similarity in (i) types of the hardware components, (ii) future uses in the hardware components, and/or (iii) expected workloads for the hardware components. For example, bundles of hardware components of similar types may be established to aggregate hardware resources into a bundle. In another example, hardware components that are likely to perform a similar workload may be bundled together (e.g., based on a subscription for a solution that indicates that a set of hardware components will contribute to providing the solution, or a portion of the solution).

For example, to establish a hardware bundle, different hardware components that may cooperate to provide a function of a computer may be identified and grouped. The groups may then be divided and/or limited based on various goals and limitations on group size and/or membership. In the context of storage functionality, hardware components such as controllers, hard disk drives, and solid state drives may be grouped. In the context of processing functionality, hardware components such as processors and graphics processing units may be grouped. In addition to grouping based on primary function, ancillary hardware components such as communication chips that support the primary functions may be added to the groups. Thus, the groups may have a primary function with some hardware components being added to the groups that support these primary functions. The hardware bundles may be established by limiting group membership thereby establishing membership in the hardware bundles.

In an embodiment, the potential hardware bundles are established by limiting membership in a bundle to meet a particular management overhead goal. For example, to facilitate management of indirect management hardware components, the corresponding direct management hardware components may need to perform some amount of work (e.g., screening communications) to limit use of the indirect management hardware components in a bundle. However, if too heavy of a management workload is placed on the direct management hardware component, it may be unable to provide its other functionalities. To reduce the likelihood of the direct management hardware component being unable to provide its other functionalities, the number of indirect management hardware components in a bundle may be limited based on the capabilities and/or responsibilities of the direct management hardware component(s) in the hardware bundle.

In an embodiment, the potential hardware bundles are established by limiting membership in a hardware bundle to meet interruption level goals. An interruption level goal may be a goal regarding the extent of disruption on operation of a managed system that interruption in the operation of any hardware component may have on its operation. Because the operation of the indirect management hardware components in a bundle may depend on the operation of the direct management hardware component(s) in the hardware bundle, the level of interruption risk presented by the bundle may scale as the bundle size expands. The level of risk may be prevented from exceeding a predetermined interruption level goal by limiting membership in the group.

In an embodiment, the potential hardware bundles are established based on the expected workload levels of different hardware components. For example, the hardware bundles may be established by distributing heavily worked hardware components across different bundles, or aggregating them together in a bundle, depending on the goal for a hardware bundle.

Once a potential hardware bundle is identified, the potential hardware bundle may be characterized to ascertain its performance levels. For example, the direct management hardware components may be instructed to enforce various limits on their operation (e.g., designed to either reduce performance of the direct or indirect management hardware components of the bundle), and the performance of the hardware bundle under these various limits may be measured by instructing various workloads to be performed and monitoring the performance of the workloads.

Figure 2B:
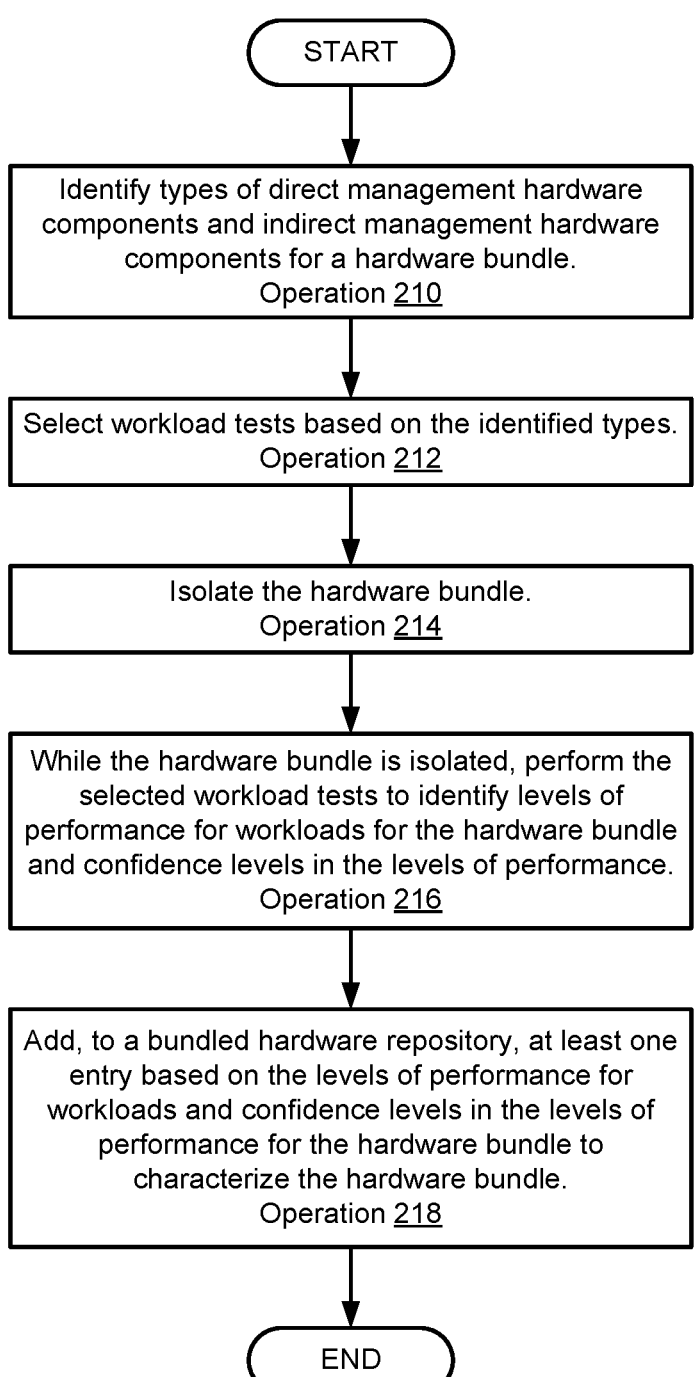

The performance estimates for the bundle may be obtained via the method shown in FIG. 2B.

At operation 204, a determination may be made regarding whether the hardware bundles are sufficiently controllable. The determination may be made by comparing the extent of control of performance of each hardware bundle to thresholds or other criteria.

For example, the thresholds may define ranges over which the performance of the hardware bundles may need to be tunable. If the performance of the hardware bundle cannot be tuned at least over a defined range, then the hardware bundle may be insufficiently controllable.

In another example, the thresholds may define levels of discretization over which performance of the hardware bundles may need to be tunable. If the performance of the hardware bundle cannot be tuned at least at as fine a level of discretization as defined by a threshold, then the hardware bundle may be insufficiently controllable.

Different thresholds or criteria may be used to ascertain whether various hardware bundles are sufficiently controllable. For example, different thresholds may be keyed to characteristics such as (i) type of hardware components of the hardware bundle, (ii) type of workload in which the hardware bundle is likely to be used, (iii) type of managed system hosting the hardware bundle, and/or other factors. Thus, different hardware bundles may be subject to different basis for comparison to determine whether they are sufficiently controllable. The thresholds or other criteria may be set by a subject matter expert, via an automated process (e.g., usability of different hardware bundles in enforcing limits on subscriptions), and/or via other methods.

If the hardware bundles are insufficiently controllable, then the method may proceed to operation 206. Otherwise, the method may proceed to operation 208.

At operation 208, bundling limitations may be imposed on the hardware resources. The bundling limitations may deny re-bundling of hardware resources that were previously bundled but were found to be insufficiently controllable. The bundling limitations may be imposed by, for example, recording information regarding the bundling limitations in a data structure used during hardware bundling. The data structure may be consulted during hardware bundling and limits which hardware resources may be bundled with other hardware resources.

Additionally, any of the hardware bundles that were found to be insufficiently controllable may be de-bundled. For example, the hardware resources from the insufficiently controllable hardware bundles may be released into a pool of hardware resources available for bundling.

When the method proceeds back to operation 202, the remaining hardware bundles may be supplemented with additional hardware bundles established using the de-bundled hardware resources, and/or other hardware resources. And this process may repeat until hardware bundles that are sufficiently controllable in operation 204 are obtained.

At operation 206, a locally maintained bundled hardware repository is updated based on the identified hardware bundles and performance of the hardware bundles. For example, the repository may be updated based on the information obtained in operation 202 and/or operation 204. Consequently, the capabilities and enforceable limitations on each of the bundles may be identified using the updated bundled hardware repository. For example, the enforceable limitations may indicate the extent to which performance of each bundle may be limited (e.g., range over which performance of a hardware bundle may be varied, discretization at which performance of the hardware bundle is adjustable, etc.).

For example, the repository may include entries corresponding to each of the hardware bundles. Each entry may include the capabilities of the bundle under different conditions (e.g., performance estimates), and confidence levels in the capabilities (e.g., confidence levels in the performance estimates).

The method may end following operation 204.

Thus, using the method shown in FIG. 2A, hardware bundles of hardware components of managed systems may be established.

Turning to FIG. 2B, a second flow diagram illustrating an expansion of operation 202 of FIG. 2A in accordance with an embodiment is shown. For example, operations 210-218 may be performed as part of operation 202.

At operation 210, types of direct management hardware components and types of indirect management hardware components of a hardware bundle are identified. The types may be identified by requesting information regarding the types from other entities, by reading the information from storage, and/or via other methods.

At operation 212, workload tests are selected based on the identified types. For example, workload tests may be keyed to the types of the direct/indirect management hardware components. The workload tests may be identified by performing a lookup in a data structure based on the types. The lookup may return the workload tests, identifiers of the workload tests, etc.

At operation 214, the hardware bundle is isolated. The hardware bundle may be isolated by performing a plan that specifies various actions to isolate the hardware bundle. The plan may be identified based on the workload tests and/or the types of the direct/indirect management hardware components. For example, the plan may be keyed to the workload tests and/or the types.

As noted above, the plan may include various sub-plans, which may be sequentially performed and/or performed in combination resulting in various operating environments in which the hardware bundle may reside. The impacts of the plans may be reverted after workload testing is performed.

At operation 216, while the hardware bundle is isolated, the selected workload tests are performed to identify levels of performance for workloads and confidence levels in the levels of performance. The selected workload tests may be performed, for example, by selectively performing sub-plans to change the operating environment in which the hardware bundle resides, performing actions specified by the workload tests to cause corresponding workloads to be performed, monitoring the performance of the actions to quantify the level of performance under the operating conditions established by the performed sub-plans, and then reverting the impact of the performed sub-plans once the monitoring and actions are complete to return a managed system to its nominal operating condition. The result of the monitoring may be the performance level for types of workloads corresponding to the workload tests.

Confidence levels in the performance levels for the types of workloads may be identified based on the workload tests, compliance with the sub-plans, and/or other factors impacting the extent to which the workload tests are likely to mimic real-world performance of similar workloads by the hardware bundle.

Additionally, while the workloads are performed, various functions of direct management hardware components of the bundle may be selectively activated to at least in part limit the functionality of indirect management hardware components of the hardware bundle. While activated, the performance of the hardware bundle may be monitored to characterize an impact of the functions. Thus, the impact on the bundle-level performance under influence of control functions by the direct management hardware components may be characterized.

At operation 218, at least one entry based on the levels of performance for the workloads and the confidence levels in the levels of performance is added to a bundle repository.

The method may end following operation 218.

Thus, using the method shown in FIGS. 2A-2B, embodiments disclosed herein may facilitate characterization of hardware bundles. The characterization may be used to (i) qualify hardware bundles with respect to controllability for subscription limit enforcement, and (ii) select whether to use a hardware bundle to service subscriptions for solutions (e.g., which may have corresponding performance requirements, service level agreements for the performance requirements, etc.).

Figure 3A:
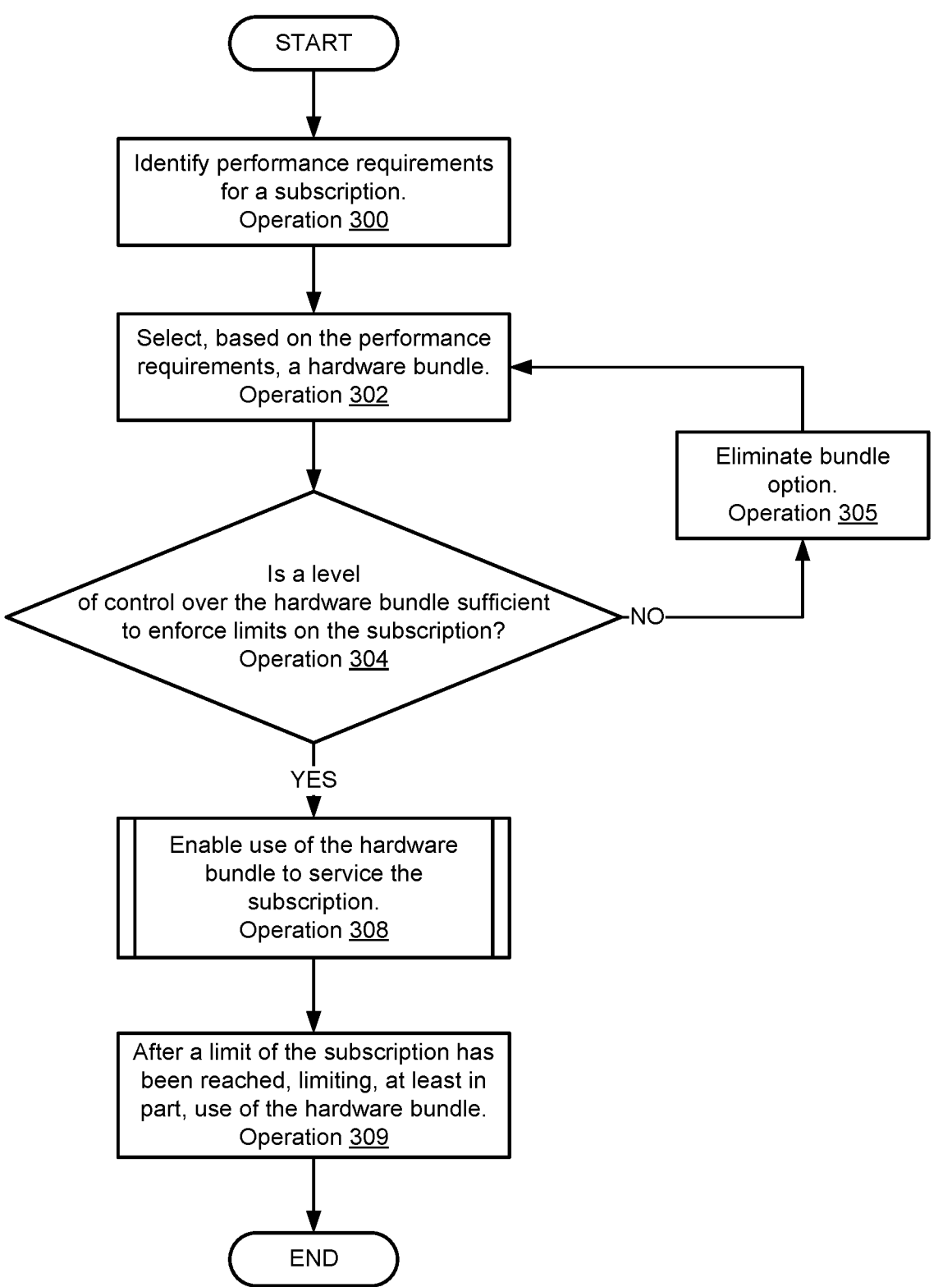

Turning to FIG. 3A, a third flow diagram illustrating a method of providing services using managed systems in accordance with an embodiment is shown. The method illustrated in FIG. 3A may be performed by any of the components of the system shown in FIG. 1A.

At operation 300, performance requirements for a subscription may be obtained. The performance requirements may be specified by the subscription. The performance requirements may be obtained by reading the performance requirements from the subscription (e.g., which may be stored as a data structure). The subscription may be obtained from a subscription management system (e.g., vi a message sent to a local subscription manager, or via other information distribution frameworks).

Additionally, information regarding the relative importance of meeting the performance requirements may be obtained. For example, the performance requirements may be governed by a service level agreement that specifies penalties for failures to provide the services.

At operation 302, a hardware bundle is selected based on the performance requirements. The hardware bundle may be selected by identifying a hardware bundle having performance (e.g., estimated performance) that meets (or exceeds) the performance requirements. The hardware bundle may be identified by comparing the performance requirements to the performance of different hardware bundles specified by the bundled hardware repository, discussed with respect to FIG. 2B.

At operation 304, a determination is made regarding whether control over the selected hardware bundle is sufficient to enforce limits on the subscription. The determination may be made by comparing limits that may be imposed on services provided under the subscription to the extent to which the performance of the hardware bundle may be controlled. The extent to which the performance of the hardware bundle may be controlled may be read from an entry of a bundled hardware repository. The limits that may be imposed on the services may be specified by the subscription (e.g., information regarding the limits and subscription may be stored in a data structure accessible by a local subscription manager).

For example, the subscription may specify that services are to be provided at a nominal rate under the subscription, and that when limits are reached the rate at which the services are to be provided should decrease in incremental steps from nominal to a reduced level over time as time passes after the subscription limit is reached. If the level of control over performance of the hardware bundle cannot be controlled over the range (e.g., nominal to reduced level) or at least at a similar level of granularity (e.g., the incremental steps), then control over the hardware bundle may be insufficient to enforce the limits on the subscription.

If the control over the hardware bundle is sufficient to enforce the limits on the subscription, then the method may proceed to operation 308. Otherwise, the method may proceed to operation 305.

At operation 308, use of the hardware bundle is enabled to service the subscription. Use of the hardware bundle may be enabled by instructing one or more direct management hardware components of the hardware bundle to update their operation. The updated operation may, for example, reduce (and/or increase) artificially imposed limits on use of indirect management hardware components of the selected hardware bundle.

For example, the artificial limitations may include restrictions on communication between the direct management hardware components and indirect management hardware components, depowering all or a portion of the indirect management hardware components, etc.

Once the limitations are in place, the hardware bundle as restricted may be characterized. The characterization may establish a baseline of performance of the hardware bundle. The baseline may be compared to the subscribed to services to ascertain whether the performance is with a range of the level of performance agreed to in the subscription. If outside of the range, the operation may be updated (e.g., increasing or decreasing artificial restrictions) until the baseline is within the range.

Once within the range, the as-characterized performance may be recorded for future comparison.

Figure 3B:
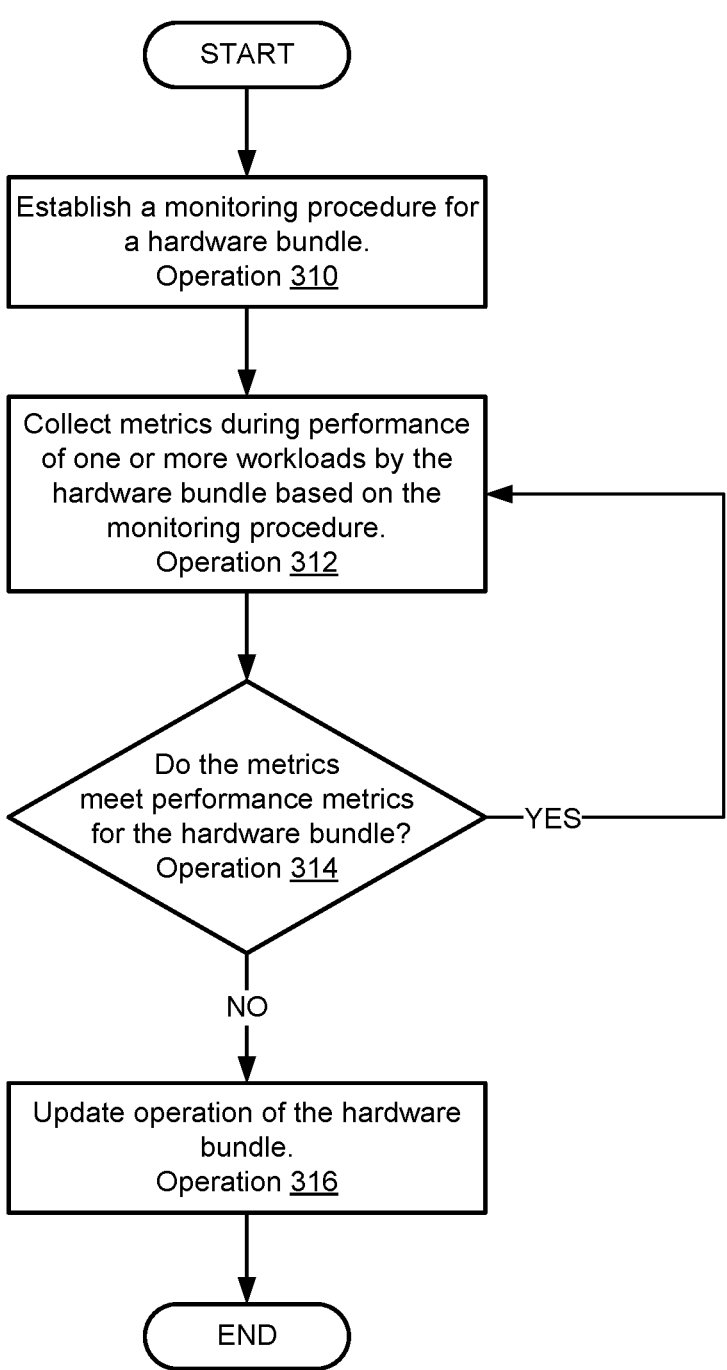

Refer to FIG. 3B for additional details regarding enabling use of the hardware bundle.

At operation 309, after a limit on the subscription is reached, use of the hardware bundle may be limited. The use of the hardware bundle may be limited by instructing the one or more direct management hardware components of the hardware bundle to update their operation a second time. The second updated operation may (i) directly reduce the ability of functions of the direct management hardware components to be used, and (ii) may, for example, increase artificially imposed limits on use of indirect management hardware components of the selected hardware bundle.

The number and extent of changes in the artificially imposed limits may be based on the remaining subscriptions. For example, when a subscription limit is reached, other subscriptions may still grant some use of the hardware bundle. Thus, the limits imposed when a subscription limit is reached may be proportional to the loss of rights to use of the hardware bundle.

To select how to impose the limits, the bundled hardware repository may be queried to identify how changes in operation of the direct management hardware components will change performance of the hardware bundle.

The method may end following operation 309.

Returning to operation 304, the method may proceed to operation 307 following operation 304 if the hardware bundle is insufficiently controllable to enforce the limits on the subscription.

At operation 307, the selected hardware bundle is eliminated as an option selectable in operation 302. The method may proceed to operation 302 following operation 307, thereby causing a different hardware bundle to be selected.

Turning to FIG. 3B, a fourth flow diagram illustrating a method of providing services using managed systems in accordance with an embodiment is shown. The method illustrated in FIG. 3B may be performed by any of the components of the system shown in FIG. 1A.

At operation 310, a monitoring procedure for a hardware bundle is obtained. The monitoring procedure may be obtained, for example, based on the type of hardware components of the bundle, based on the workload to be performed by the hardware bundle, and/or via other information. The monitoring procedure may be obtained by performing a lookup (or other processing operation) using the information on which the monitoring procedure is based. For example, different types of monitoring procedures associated with different types of hardware components may be stored in a data structure. The monitoring procedures may be established by a subject matter expert. The monitoring procedures may perform actions to be performed to characterize the performance of the hardware bundle. For example, performance of the actions may cause information regarding operation of the hardware bundle to be aggregated.

The information may include, for example, actions performed by direct management hardware components, and inferences regarding actions performed by indirect management components. In contrast to the direct management hardware components, the indirect management components (one or more) may include functionality to monitor their operation and report information regarding their operation. To estimate the operation of the indirect management components, the direct management components may collect information usable to infer the operation of the indirect management components. For example, the direct management hardware components may monitor communications between the indirect management hardware components and/or other components. These communications may include instructions, acknowledgements, confirmations, and/or other types of information indirectly usable to ascertain the operations performed by the indirect management hardware components. The direct management hardware components may snoop (e.g., read/review within being an expected recipient) these communications, and use the communications to estimate the operation of the indirect management hardware components.

The direct management hardware components may also aggregate other types of information such as, for example, temperature, power consumption, audio level, and/or other quantifications regarding properties of the indirect management hardware components. These quantifications may be used to confirm and/or supplement the information used to estimate operation of the indirect management hardware components.

At operation 312, metrics are obtained during performance of one or more workloads by the hardware bundle based on the monitoring procedure. The metrics may be obtained by performing actions indicated by the monitoring procedure. Performance of the actions may cause the direct management hardware components of the hardware bundle to collect and provide information regarding and/or estimates of the operation of the hardware bundle. The information and/or estimates may be the metrics. The metrics may include, for example, rates at which the workloads are performed, rates at which different types of operations (e.g., hardware operations) are performed by the direct/indirect hardware components of the hardware bundles to support performance of the one or more workloads.

The workloads may be, for example, natively performed workloads in accordance with services provided as part of a subscription, and/or artificial workloads performed only to characterize the performance of the hardware bundles. The workloads may be similar to workloads originally performed to establish a baseline of performance for the hardware bundle.

At operation 314, a determination is made regarding whether the metrics obtained at operation 312 meet performance metrics for the hardware bundle. The performance metrics for the hardware bundle may be the baseline performance of the hardware bundle established when restrictions on operation of the hardware bundle are put in place, and an allowed degree of deviation from the baseline performance (which may be established by the subscription, by collateral agreements, etc.).

If the metrics meet the performance metrics, then the method may return to operation 312. Otherwise the method may proceed to operation 316.

At operation 316, operation of the hardware bundle is updated. The operation of the hardware bundle may be updated by modifying the restrictions placed on operation of the hardware bundle, similarly to how the restrictions were initially put in place as described with respect to FIG. 3A.

For example, changes in the restrictions may be made and performance of the hardware bundle may be characterized until the performance meets the performance metrics.

The method may end following operation 316.

Thus, via the methods illustrated in FIGS. 2A-3B, subscription limits may be enforced on a broad variety of hardware components regardless of whether they include native functionality to place limits on the ability of other entities to utilize their functionalities. Further, the hardware bundle selected to service the subscriptions may be more likely to meet performance requirements for the subscription. Consequently, the services provided to service the subscription may be more likely to match those expected by subscribed users.

Further, overtime the performance of the hardware bundles selected to service the subscriptions may be monitored for deviation from performance metrics. If deviation is detected, the operation of the hardware bundle may be updated.

Turning to FIGS. 4A-5B, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Figure 4A:
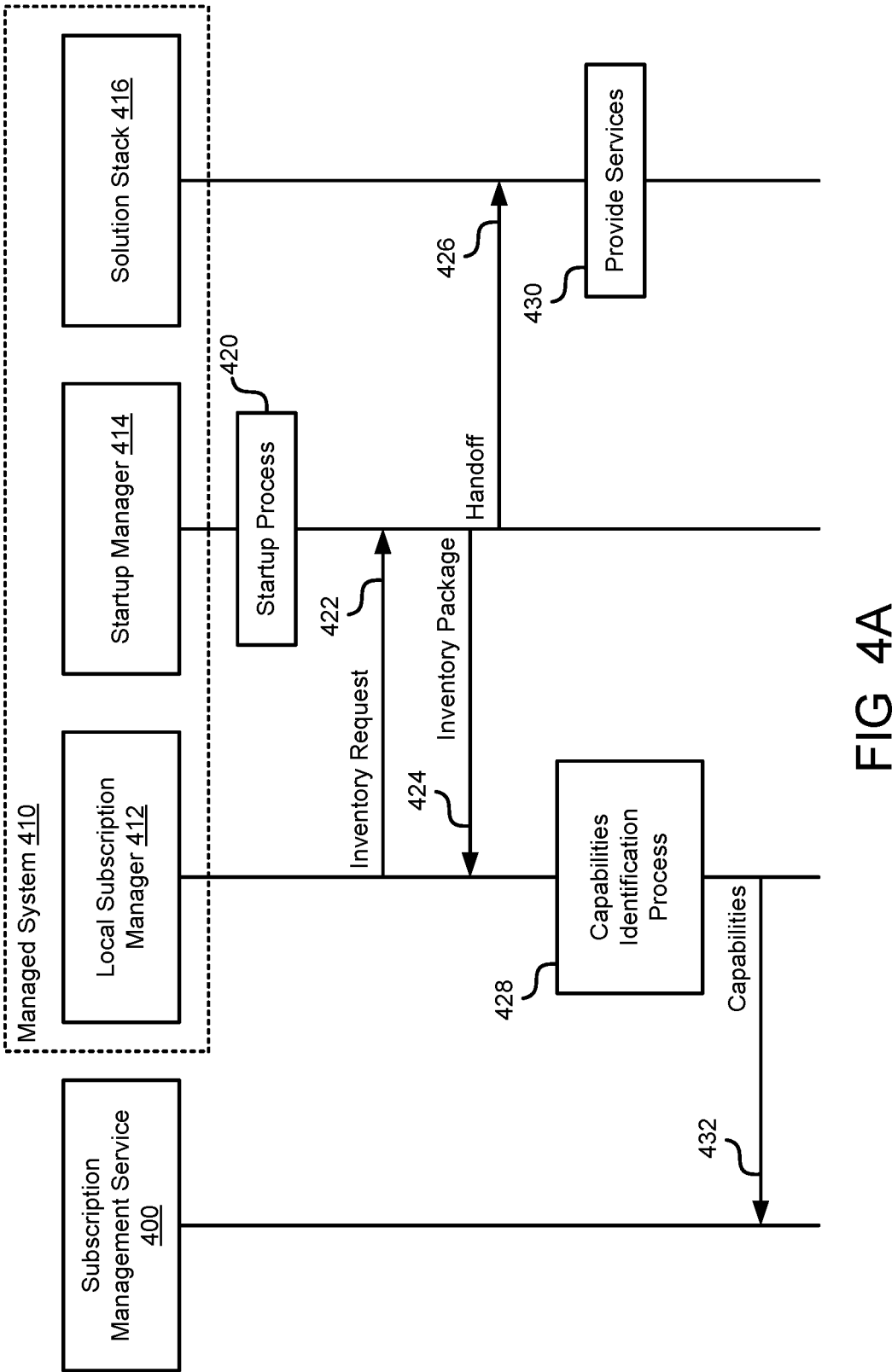
FIGS. 4A-5B show diagrams illustrating interactions between and actions of components of a system in accordance with an embodiment.

Turning to FIG. 4A, consider a scenario where managed system 410 begins, at block 420, to perform a startup. The startup may be performed to place managed system 410 in a predetermined operating state. Subscription management service 400 may manage managed system 410 such that it enters the predetermined operating state in which it is likely to be able to provide desired computer implemented services with solution stack 416.

At block 422, local subscription manager hosted by managed system 410 identifies the startup and sends an inventory request to startup manager 414. As part of the startup, startup manager 414 may perform a resource inventory of managed system 410 through which it may identify the available (e.g., enabled) hardware components of managed system 410.

At block 424, in response to the request, startup manager 414 provide an inventory package to local subscription manager 412. The inventory package may include information regarding the hardware components of managed system 410.

Using the inventory data package, at block 428, local subscription manager performs a capabilities identification process for managed system 410 to identify the capabilities of managed system 410. Local subscription manager 412 may locally record the capabilities and, at block 432, notify subscription management service 400 regarding the capabilities.

While, before, or after any of blocks 424, 428, and 432 are performed, at block 426, startup manager 414 may complete the startup and perform a handoff of operational management of managed system 410 such that the operation manager and/or applications of solution stack 416 begin operation. Startup manager 414 may suspend or terminate its operation after the handoff.

At block 430, solution stack 416 begins to provide services, which may be computer implemented services provided to users of and/or devices operably connected to managed system 410.

However, to provide the services, hardware supporting solution stack 416 may need to be provisioned ahead of and/or as part of operation of solution stack 416. To select which hardware to provision, the capabilities of the hardware may need to be known.

Figure 4B:
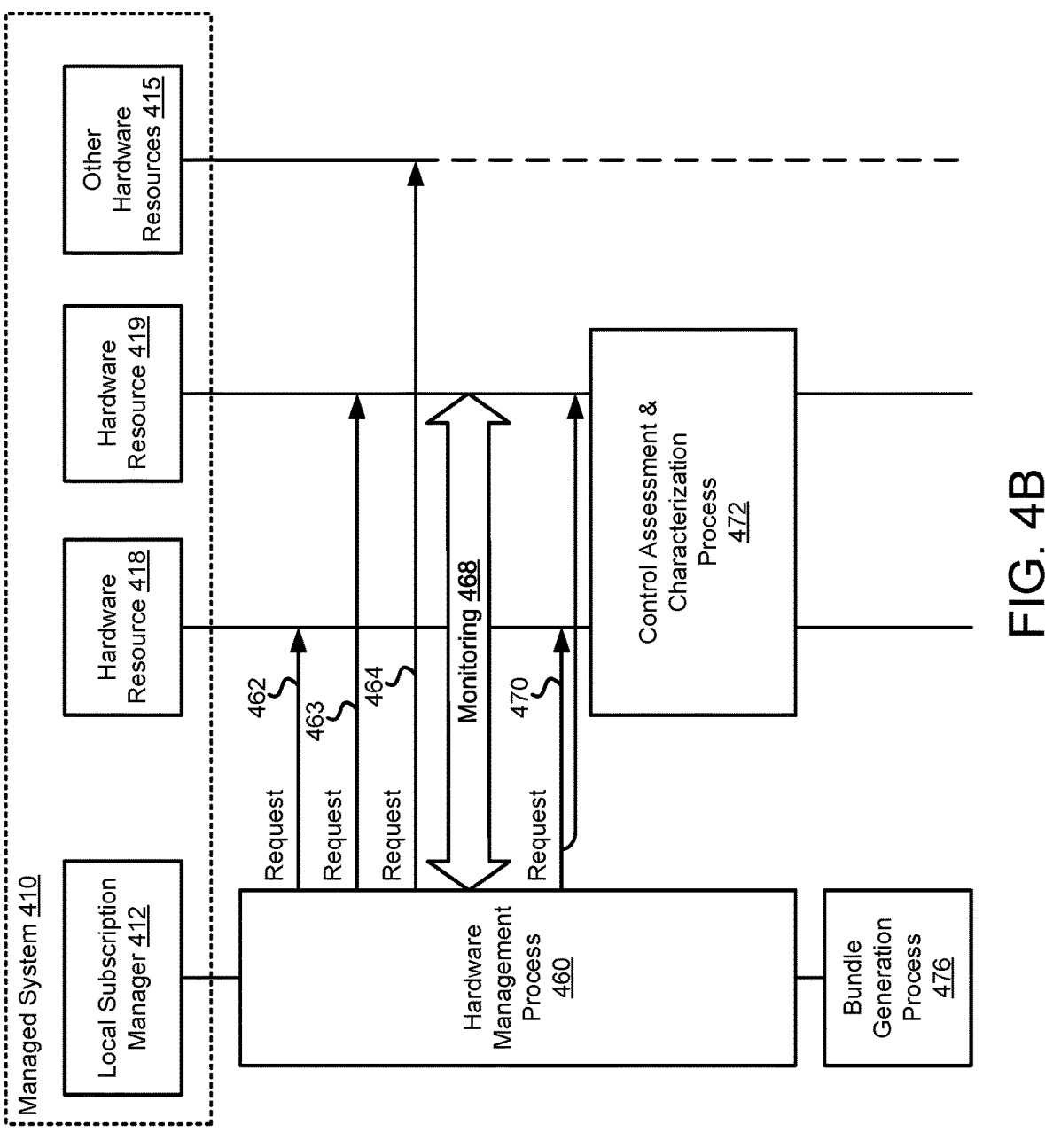

Turning to FIG. 4B, consider a scenario where managed system 410 begins to perform hardware management process 460. During hardware management process 460, local subscription manager 412 may establish and characterize various hardware bundles.

To do so, at blocks, 462-463, request for information regarding hardware resources 418-419 may be made to obtain information regarding these hardware resources. In this example, the hardware resources may be usable to establish a hardware bundle. For example, hardware resource 418 may be a storage controller and hardware resource 419 may be a storage device.

To ascertain the performance level of the potential hardware bundle, at block 464, a request may be sent to other hardware resources 415. The request may, as discussed with respect to FIGS. 1G-1H, cause hardware resources 418-419 to be isolated through a variety of different mechanisms (e.g., communication isolation, depowering, etc.). Thus, following receipt of the request, other hardware resources 415 may begin to have a reduced level of influence on hardware resources 418-419 (in FIG. 4B, this is shown by drawing the line past the arrow of block 464 in dashing).

Once isolated, at blocks 468 and 474, monitoring of operation of hardware resources 418-419 may be initiated and request may be sent to hardware resource 418 and/or 419. The request may cause the hardware resources to begin to perform various workload tests and test the level of control hardware resource 418 has over hardware resource 419. For example, to test the level of control, various limitations on the operation of hardware resource 418 may be implemented to identify how the limitations impact the operation of hardware resource 419. Similarly, various workload tests may be performed and monitored to estimate the performance level of the potential hardware block for various types of workloads.

Once the resulting control assessment and characterization process 472 is completed (e.g., the workload tests and control assessments), bundle generation process 476 may be performed. During bundle generation process, an entry may be generated in a hardware bundle repository. The entry may, as discussed above, may include the corresponding workload test results (e.g., estimated performance for various workloads to establish baselines for comparison), confidence levels in the estimated performance levels for different types of workloads, levels of control over the hardware bundle, etc.

Thus, once established, the entry may be used to select the hardware bundle (e.g., 417, shown in FIG. 4C) for servicing a subscription.

Figure 4C:
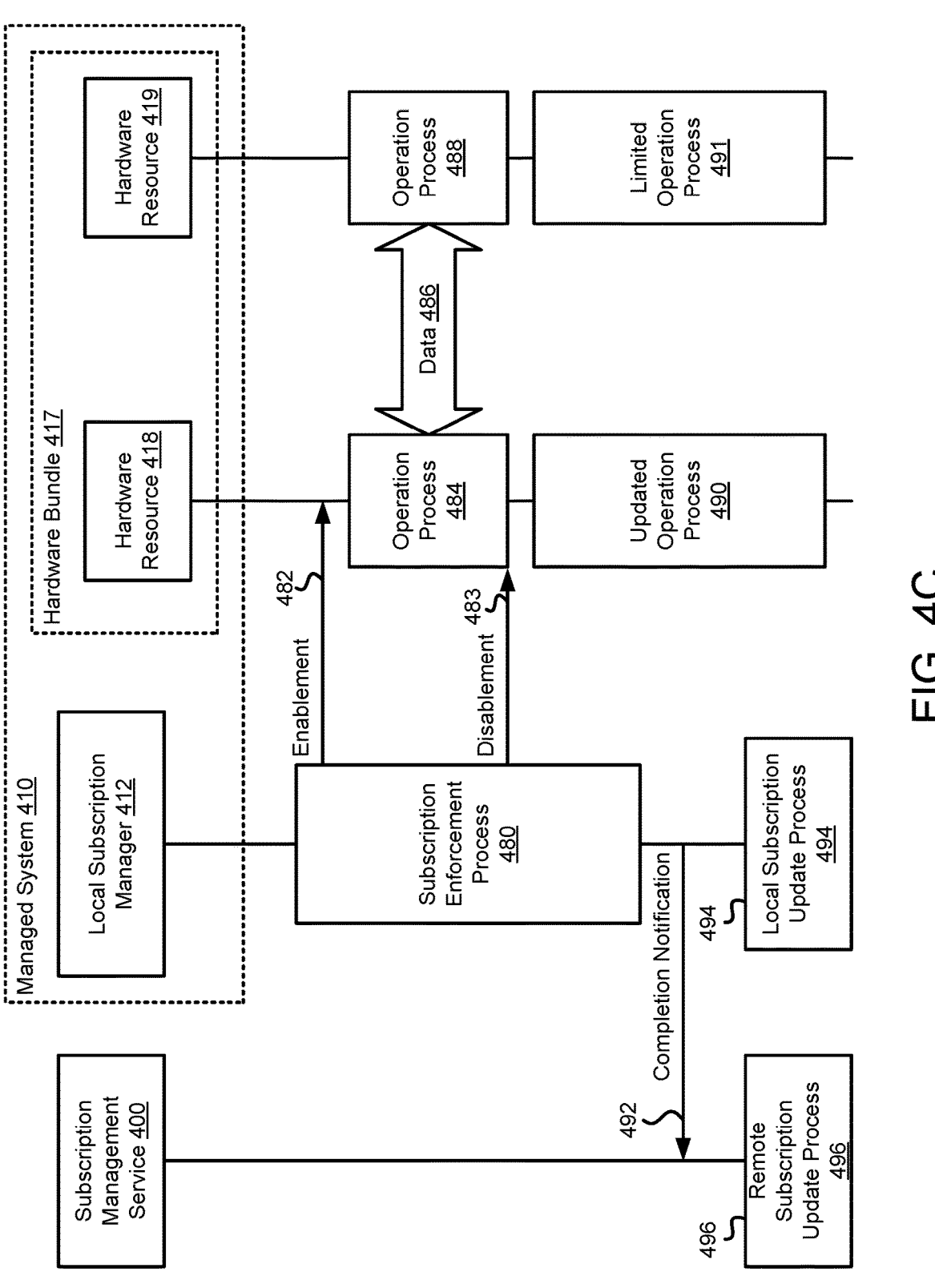

Turning to FIG. 4C, now consider a scenario where, to implement the solution stack to service a subscription, local subscription manager 412 is tasked with selecting and dedicating hardware (e.g., in this example, hardware bundle 417) for use to satisfy a subscription for the solution stack.

To satisfy the subscription, subscription enforcement process 480 may be performed. During subscription enforcement process, hardware bundle 417 (e.g., established via the interactions shown in FIG. 4B) may be selected for use in satisfying the subscription because it has an estimated level of performance and sufficient confidence in the estimate to meet the requirements of the subscription (e.g., and corresponding service level agreement).

Once selected, to enable use of the hardware bundle 419, at block 482, an enablement request may be sent to hardware resource 418. The enablement request may request that hardware resource 418 update its operation to enable use of both hardware resources 418-419.

In response to the enablement request, hardware resource 418 may update its operation thereby causing it to perform operation process 484. During operation process 484, limits on transmission of data from hardware resource 418 to hardware resource 419 may be removed (or reduced to provide a level of hardware bundle performance commensurate with that subscribed to for services provided using the hardware bundle). Thus, data 486, previously screened from hardware resource 419, may flow freely between the hardware resources. Consequently, hardware resource 419 may perform operation process 488 may by virtue of the flow of data, albeit limited by any restrictions in operation put in place. Accordingly, while operation process 484 and operation process 488 are performed, users of managed system 410 may utilize these hardware resources thereby allowing the solution stack to execute with limitations for performance commensurate with subscribed to levels of performance. Refer to FIGS. 5A-5B for details regarding monitoring of performance and updating of operation of hardware bundles to maintain performance of the hardware bundles.

However, subscription enforcement process 480 may also keep track of limits on subscriptions. The limits may be time based, usage base, or may be based on other types of criteria. Consequently, once a limit on the subscription is reached, subscription enforcement process 480 may, at block 483, automatically send a request to hardware 418 that causes use of hardware resource 419 to be limited or prevented.

Consequently, when the request at block 483 is received, hardware resource 418 may again update its operation to start performing updated operation process 490. During updated operation process 490, data may be screened from hardware resource 419 thereby depriving users of managed system 410 from use of at least some of the functionality of hardware resource 419.

Consequently, while data 486 is screened from hardware resource 419, hardware resource may enter into a limited operation process 491, where its functionality may be artificially limited by operation updated operation process 490 performed by hardware resource 418.

After completion of the subscription enforcement, at block 492, local subscription manager 412 may send a completion notification to subscription management service 400. In response, subscription management service 400 may perform remote subscription update process 496 to track that the subscription limit on the subscription has been enforced by managed system.

Local subscription manager 412 may also perform a local subscription update process 494 for the subscription to record the fact that the limit has been reached and that the limit is being enforced.

Thus, via the processes illustrated in FIGS. 4A-4C, embodiments disclosed herein may provide for the automated and distributed configuration of various managed systems in a distributed system. By doing so, the cognitive burden on users and managers of managed systems may be reduced.

Turning to FIG. 5A, consider a scenario where managed system 410 provides subscribed to services using hardware bundle 417 after it has been enabled, with restrictions. While the services are provided, local subscription manager 412 may perform performance management process 500. During performance management process 500, local subscription manager 412 may monitor performance of hardware bundle 417 for deviation from baseline levels of performance.

To do so, local subscription manager 412 may, at block 502, send a request to hardware resource 418. The request may instruct hardware resource 418 to perform various monitoring actions in accordance with a selected monitoring plan. The monitoring plan may be based on the types of hardware resources of hardware bundle 417, and may be similar to those performed during control assessment & characterization process.

To reduce a level of impact on operation of hardware bundle 417 due to additional computational overhead for monitoring processes, monitoring process 504 performed based on the request may attempt to use existing workloads (e.g., 506-510) to collect metrics usable to ascertain the level of performance provided by hardware bundle 417. For example, during monitoring process 504, hardware resource 418 may monitor workloads performed by hardware bundle 417 to ascertain if any are similar to workloads performed to characterize a baseline level of performance of hardware bundle 417. For those that are similar, the workload performance may be monitored to obtain metrics used to compare the performance of hardware bundle 417 to a baseline.

For example, hardware resource 418 may monitor its activity and infer the activity of hardware resource 419. The monitored activity may be used to obtain performance metrics such as, for example, the rates at which the workloads are performed (e.g., performance metrics corresponding to each of the hardware resources of hardware bundle 417).

If insufficient numbers and/or types of naturally performed workloads are hosted by hardware bundle 417 during monitoring process, hardware resource 418 may spawn artificial workloads. The artificial workloads may be spawned, for example, by requesting that local subscription manager 412 cause the artificial workloads to be spawned, by requesting that other components spawn the workloads, etc. The artificial workloads may be workload tests that do not contribute to subscribed to services provided by managed system 410. Thus, the artificial workloads may incur overhead on managed system 410 thereby decreasing its ability to provide desired subscribed to services. Accordingly, by preferentially monitoring for workload performed as part of subscribed to services that may double as workload tests, managed system 410 may increase the dedication of computing resources for subscribed to services while still enabling performance testing to be completed.

Once completed, at block 512, results may be provided to local subscription manager 412 based on monitoring process 504. The results may include the metrics thereby allowing local subscription manager 412 to compare the results to baselines for hardware bundle 417.

If the comparison indicates that performance of hardware bundle 417 falls outside of prescribed ranges, then various remedial activity may be initiated. Refer to FIG. 5B for additional details for remedial activity.

Otherwise, similar monitoring processes may be performed overtime to attempt to detect whether the performance of hardware bundle 417 is likely to cause the subscribed to services to fail to meet quality expectations.

Turning to FIG. 5B, consider a scenario where local subscription manager 412 ascertains that the performance of hardware bundle 417 no longer meets performance metrics. At block 530, local subscription manager 412 may send an operation update request to hardware resource 418. The operation update request may specify changes in operation of hardware resource 418 that reduce restrictions on operation of hardware resource 419. For example, the reduced restrictions may improve the performance of hardware resource 419, and hardware bundle 417 as a whole.

The specific changes may be based on the previously established performance of hardware bundle 417 under different restrictions enforced by hardware resource 418. The changes in performance based on different types of restrictions may be used to select the changes in operation of hardware resource 418.

Once the request is obtained by hardware resource 418, operation update process 532 may be performed to update operation of hardware resource 418.

Consequently, when subsequent workloads 534, 536 are performed by hardware bundle 417, the performance of hardware bundle 417 may be improved thereby causing the resulting performance of the workloads to be better aligned with the quality of services to be provided under a subscription.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of managed systems if the control layer for the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control plane used to manage the configuration of the distributed system may be far more resilient to malicious attacks.

Accordingly, embodiments disclosed herein may be provide for the improved operation of distributed system by improving resilience to malware or other types of third party attacks while still providing for configurability over time such that various types of desired solutions may be provided over time.

As discussed above, various components may be implemented with computing devices. For example, any of the components illustrated in FIGS. 1A-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like.

More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional 10 device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A method for managing computer implemented services provided by a managed system, the method comprising:

bundling hardware resources to establish a hardware bundle that contributes to performance of the computer implemented services at a bundle level, the hardware bundle comprising at least one directly manageable hardware component and at least one indirectly manageable hardware component;

assigning a performance characterization to the hardware bundle;

adjusting the performance characterization of the hardware bundle based on a level of control over the hardware bundle;

establishing, by a local subscription manager, a monitoring procedure for the hardware bundle;

obtaining, by the local subscription manager and based on the monitoring procedure, metrics during performance of a workload by the hardware bundle;

making, by the local subscription manager, a determination regarding whether the metrics met performance metrics for the hardware bundle; and in a first instance of the determination where the metrics did not meet the performance metrics:

updating operation of the hardware bundle to improve a likelihood of future metrics based on future performance of a future workload by the hardware bundle meeting the performance metrics, wherein the updating operation comprises controlling, by the local subscription manager, the at least one directly manageable hardware component via a sideband communication interface during execution of the workload.

2. The method of claim 1, wherein the monitoring procedure indicates performance of monitoring actions by the at least one directly manageable hardware component.

3. The method of claim 2, wherein obtaining the metrics comprises:

performing, by the at least one directly manageable hardware component, the monitoring actions to obtain a first portion of the metrics that indicate a first performance level of the at least one directly manageable hardware component and a second performance level of the at least one indirectly manageable hardware component.

4. The method of claim 3, wherein the performance metrics comprise a first sub-metric as a first basis of comparison for the first performance level and a second sub-metric as a second basis of comparison for the second performance level.

5. The method of claim 3, wherein updating the operation of the hardware bundle comprises:

reducing, by the directly manageable hardware component, a level of restriction imposed on the second performance level to obtain an updated level of the restriction.

6. The method of claim 5, wherein the level of restriction is based, at least in part, on a subscription that governs an extent of use of the hardware bundle by a user.

7. The method of claim 5, wherein reducing the level of restriction comprises:

expanding, by the directly manageable hardware component, a range of communications that are passed to indirectly manageable hardware component.

8. The method of claim 1, wherein the at least one directly manageable hardware component is adapted to be managed by the local subscription manager.

9. The method of claim 8, wherein the at least one indirectly manageable hardware component is not manageable by the local subscription manager.

10. The method of claim 9, wherein the at least one directly manageable hardware component is operably connected to the at least one indirectly manageable hardware component in a communication topology that facilitates screening of communications to the at least one indirectly manageable hardware component by the at least one directly manageable hardware component.

11. A non-transitory machine-readable medium having instructions stored therein, which when executed by a processor, cause the processor to perform operations for managing computer implemented services provided by a managed system, the operations comprising:

bundling hardware resources to establish a hardware bundle that contributes to performance of the computer implemented services at a bundle level, the hardware bundle comprising at least one directly manageable hardware component and at least one indirectly manageable hardware component;

assigning a performance characterization to the hardware bundle;

adjusting the performance characterization of the hardware bundle based on a level of control over the hardware bundle;

establishing, by a local subscription manager, a monitoring procedure for the hardware bundle;

obtaining, by the local subscription manager and based on the monitoring procedure, metrics during performance of a workload by the hardware bundle;

making, by the local subscription manager, a determination regarding whether the metrics met performance metrics for the hardware bundle; and in a first instance of the determination where the metrics did not meet the performance metrics:

updating operation of the hardware bundle to improve a likelihood of future metrics based on future performance of a future workload by the hardware bundle meeting the performance metrics, wherein the updating operation comprises controlling, by the local subscription manager, the at least one directly manageable hardware component via a sideband communication interface during execution of the workload.

12. The non-transitory machine-readable medium of claim 11, wherein the monitoring procedure indicates performance of monitoring actions by the at least one directly manageable hardware component.

13. The non-transitory machine-readable medium of claim 12, wherein obtaining the metrics comprises:

performing, by the at least one directly manageable hardware component, the monitoring actions to obtain a first portion of the metrics that indicate a first performance level of the at least one directly manageable hardware component and a second performance level of the at least one indirectly manageable hardware component.

14. The non-transitory machine-readable medium of claim 13, wherein the performance metrics comprise a first sub-metric as a first basis of comparison for the first performance level and a second sub-metric as a second basis of comparison for the second performance level.

15. The non-transitory machine-readable medium of claim 13, wherein updating the operation of the hardware bundle comprises:

reducing, by the directly manageable hardware component, a level of restriction imposed on the second performance level to obtain an updated level of the restriction.

16. A managed system, comprising:

directly manageable hardware components;

indirectly manageable hardware components;

a processor; and a local subscription manager adapted to perform operations for managing computer implemented services provided by the managed system, the operations comprising:

bundling hardware resources to establish a hardware bundle that contributes to performance of the computer implemented services at a bundle level, the hardware bundle comprising at least one directly manageable hardware component of the directly manageable hardware components and at least one indirectly manageable hardware component of the indirectly manageable hardware components;

assigning a performance characterization to the hardware bundle;

adjusting the performance characterization of the hardware bundle based on a level of control over the hardware bundle;

establishing, by a local subscription manager, a monitoring procedure for the hardware bundle;

obtaining, by the local subscription manager and based on the monitoring procedure, metrics during performance of a workload by the hardware bundle;

making, by the local subscription manager, a determination regarding whether the metrics met performance metrics for the hardware bundle; and in a first instance of the determination where the metrics did not meet the performance metrics:

updating operation of the hardware bundle to improve a likelihood of future metrics based on future performance of a future workload by the hardware bundle meeting the performance metrics, wherein the updating operation comprises controlling, by the local subscription manager, the at least one directly manageable hardware component via a sideband communication interface during execution of the workload.

17. The managed system of claim 16, wherein the monitoring procedure indicates performance of monitoring actions by the at least one directly manageable hardware component.

18. The managed system of claim 17, wherein obtaining the metrics comprises:

performing, by the at least one directly manageable hardware component, the monitoring actions to obtain a first portion of the metrics that indicate a first performance level of the at least one directly manageable hardware component and a second performance level of the at least one indirectly manageable hardware component.

19. The managed system of claim 18, wherein the performance metrics comprise a first sub-metric as a first basis of comparison for the first performance level and a second sub-metric as a second basis of comparison for the second performance level.

20. The managed system of claim 18, wherein updating the operation of the hardware bundle comprises:

reducing, by the directly manageable hardware component, a level of restriction imposed on the second performance level to obtain an updated level of the restriction.

* * * * *